United States Patent
Inoguchi

(10) Patent No.: US 8,467,042 B2
(45) Date of Patent: Jun. 18, 2013

(54) LENS SHAPE MEASURING APPARATUS AND THE METHOD THEREOF, MANUFACTURING METHOD OF SPECTACLE LENS, AND MANUFACTURING METHOD OF SPECTACLES

(75) Inventor: Masaaki Inoguchi, Tokyo (JP)

(73) Assignee: Hoya Corporation, Tokyo (JP)

( * ) Notice: Subject to any disclaimer, the term of this patent is extended or adjusted under 35 U.S.C. 154(b) by 233 days.

(21) Appl. No.: 12/309,763

(22) PCT Filed: Jul. 31, 2007

(86) PCT No.: PCT/JP2007/065026
§ 371 (c)(1),
(2), (4) Date: Mar. 16, 2009

(87) PCT Pub. No.: WO2008/016066
PCT Pub. Date: Feb. 7, 2008

(65) Prior Publication Data
US 2009/0268199 A1    Oct. 29, 2009

(30) Foreign Application Priority Data
Jul. 31, 2006  (JP) ................. 2006-208813

(51) Int. Cl.
*G01B 9/00*  (2006.01)

(52) U.S. Cl.
USPC ........ 356/124; 356/241; 356/600; 356/237.5; 702/188; 351/177; 351/169

(58) Field of Classification Search
USPC .... 356/124, 600, 237.5, 237.4, 127; 702/188; 351/169, 177; 438/6
See application file for complete search history.

(56) References Cited

U.S. PATENT DOCUMENTS 4,966,460 A * 10/1990 Kahley .................... 356/640
5,085,516 A *  2/1992 Bertrand et al. ............ 356/394
(Continued)

FOREIGN PATENT DOCUMENTS

| JP | A-62-009858 | 1/1987 |
| JP | A-06-175087 | 6/1994 |

(Continued)

*Primary Examiner* — Tarifur Chowdhury
*Assistant Examiner* — Isiaka Akanbi
(74) *Attorney, Agent, or Firm* — Oliff & Berridge, PLC

(57) ABSTRACT

A lens shape measuring apparatus measures a peripheral shape of a lens in order to measure the peripheral shape of the lens accurately according to a non-contact technique. The lens shape measuring apparatus includes: a lens holding mechanism section for holding the lens with the holding axis from the side of a lens surface; and a laser displacement meter for measuring a lens peripheral shape by irradiating a laser beam to the periphery of the lens and receiving a reflected light thereof. The laser displacement meter is installed such that a light projecting section for projecting a laser beam and a light receiving section for receiving a laser beam are aligned in a direction perpendicular to an axis line of the holding axis. The lens shape measuring apparatus causes the lens holding mechanism section to change a lens holding position without changing the axial direction of the holding axis, and causes the laser displacement meter to irradiate a laser beam to the lens periphery at each lens holding position and to measure the peripheral shape of the lens.

15 Claims, 14 Drawing Sheets

U.S. PATENT DOCUMENTS

| | | | |
|---|---|---|---|
| 5,506,683 A * | 4/1996 | Yang et al. | 356/606 |
| 6,122,063 A | 9/2000 | Berndt et al. | |
| 6,657,711 B1 * | 12/2003 | Kitagawa et al. | 356/155 |
| 6,749,377 B2 | 6/2004 | Gottschald et al. | |
| 6,813,536 B1 * | 11/2004 | Gottschald | 700/160 |
| 6,896,587 B2 * | 5/2005 | Guillermin et al. | 451/8 |
| 7,201,631 B2 * | 4/2007 | Thepot et al. | 451/5 |
| 7,359,828 B2 * | 4/2008 | Guillermin et al. | 702/167 |
| 7,667,857 B2 * | 2/2010 | Nishio | 356/614 |
| 7,768,632 B2 * | 8/2010 | Sotgiu | 356/139.09 |
| 2002/0176756 A1 | 11/2002 | Gottschald et al. | |
| 2004/0039546 A1 | 2/2004 | Guillermin et al. | |

FOREIGN PATENT DOCUMENTS

| | | |
|---|---|---|
| JP | A-2001-519025 | 10/2001 |
| JP | A-2005-153024 | 6/2005 |
| JP | A-2005-227159 | 8/2005 |

* cited by examiner (A)

(B)

LENS SHAPE MEASURING APPARATUS AND THE METHOD THEREOF, MANUFACTURING METHOD OF SPECTACLE LENS, AND MANUFACTURING METHOD OF SPECTACLES

TECHNICAL FIELD

The present invention relates to an apparatus and method for measuring a peripheral shape of a lens according to a non-contact technique. In particular, it relates to a lens shape measuring apparatus and a lens shape measuring method which are suitable for measuring, with use of a laser displacement meter, a lens peripheral shape including a bevel or a groove which is formed at a periphery of a spectacle lens, a method of manufacturing a spectacle lens of spectacles with use of the lens shape measuring apparatus or the lens shape measuring method, and a manufacturing method.

BACKGROUND

After an uncut spectacle lens is edged to a lens shape (i.e., the edge of an uncut lens is profiled), it is necessary to judge whether or not the lens has been machined according to a desired machining shape data. For this purpose, there is a conventional art of measuring a peripheral shape and a circumference of a machined lens with use of the lens shape measuring apparatus as disclosed in Patent Document 1.

In the lens shape measuring apparatus as disclosed in Patent Document 1, the lens is rotated with engaging a groove of a stylus (probe) with a bevel at the periphery of the lens which is rotatably held by the holding axis such that the groove is pressed to the bevel, an amount of movement of the stylus that moves in the radial direction and in the vertical direction of the lens is detected at certain angles, and a peripheral shape of an entire circumference of the lens is measured based on this amount. In addition, the circumference of the lens is also calculated based on the measured data.

Further, there is an art as disclosed in Patent Document 2 for measuring a contour shape of a lens according to a non-contact technique. In Patent Document 2, after the lens is roughly machined, a line-shaped laser beam is irradiated on an edge surface of the lens, whereby a line of the laser beam is displayed on a lens surface, an image of the line which is displayed is taken with a video camera, and a peripheral shape data of the lens (a width and position of the edge surface) is measured through image processing. Next, finish machining is applied based on the thus acquired shape data, and a bevel is formed on the lens edge surface.

[Patent Document 1] Japanese Patent Application Laid Open No. H6-175087
[Patent Document 2] US Patent Publication No. 6749377

DISCLOSURE OF THE INVENTION

Problem to be Solved by the Invention

In the case where a peripheral shape of the lens is measured according to contact technique such as with a lens shape measuring apparatus disclosed in Patent Document 1, there are some cases where the shape of the bevel and the groove cannot be measured accurately. That is, there are some cases where the probe does not contact the distal end of the bevel or the bottom of the groove depending on the shape of the probe and the shapes of the bevel and the groove. For example, when the bevel is measured, there are some cases where measurement is made with the distal end of the bevel not in contact with the bottom of the groove of the probe, and the opening of the groove of the probe in contact with the slope of the bevel. In such cases, the apex of the bevel is determined by calculation.

However, there are some cases where the bevel apex based on the calculated value sometimes differs from the actual shape, because the bevel and the groove sometimes differ in shape (such as the angle, the width, or the like of the bevel) depending on the position in the circumferential direction. In addition, in a method with use of such a probe, the angle and the width of the bevel and the groove and the shape of the entire periphery cannot be measured all at once. In addition, the probe needs be changed depending on a measurement object (the types of the bevel and the groove), which makes the measurement complicated.

Further, in the case where the peripheral shape of the lens is measured according to the non-contact technique with use of image processing as with the lens shape measuring apparatus as described in Patent Document 2, there is a drawback of low measurement accuracy. Therefore, in the case where the shape is complicated shape such as in the bevel and the groove, it is difficult to accurately measure such complicated peripheral shape of the lens.

The present invention has been made in consideration of the above, and an object thereof is to provide a lens shape measuring apparatus that can accurately measure a peripheral shape of a lens according to a non-contact technique and a method thereof, a spectacle lens manufacturing method for manufacturing a spectacle lens by measuring a peripheral shape of a spectacle lens with use of the lens shape measuring apparatus, and a spectacles manufacturing method by mounting a spectacle lens[C1] manufactured by the method of manufacturing a spectacle lens to a spectacle frame.

Means for Solving Problems

The invention may relate to a lens shape measuring apparatus for measuring a peripheral shape of a lens, including: a lens holding mechanism section for holding the lens with a holding axis from the side of a lens surface; and a laser displacement meter for measuring a lens peripheral shape by irradiating a laser beam to the periphery of the lens and receiving a reflected light thereof, wherein, the laser displacement meter is installed such that a light projecting section for projecting a laser beam and a light receiving section for receiving a laser beam are aligned in a direction perpendicular to an axis line of the holding axis, and the lens shape measuring apparatus causes the lens holding mechanism section to change a lens holding position without changing the axial direction of the holding axis, and causes the laser displacement meter to irradiate a laser beam to the lens periphery at each lens holding position and measure the peripheral shape of the lens.

The invention discussed above wherein the holding axis of the lens holding mechanism section may be rotatable around the axis and movable in the axial direction, the change of the lens holding position is made by changing a rotational position and an axial direction position of the holding axis, and the irradiation of a laser beam by the laser displacement meter is made by irradiating a laser beam in a spot-like form.

The invention discussed above wherein the change of the lens holding position may be made by moving the axial direction position at each rotational position on the holding axis.

The invention discussed above wherein the movement of the axial direction position may be moved in a certain direction at each rotational position on the holding axis, and the movement direction is made opposite every time the rotational position is changed.

The invention discussed above wherein the change of the lens holding position may be made by moving the rotational position at each axial direction position on the holding axis.

The invention discussed above wherein measurement may be completed at the stage where it is judged that measurement cannot be made for the entire circumference of the peripheral shape of the lens.

The invention discussed above wherein the holding axis of the lens holding mechanism section may be rotatable around the axis, the change of the lens holding position is made by changing the rotational position of the holding axis, and the irradiation of a laser beam by the laser displacement meter is made by irradiating a laser beam in a line-shaped form.

The invention discussed above wherein the laser displacement meter may be installed such that a measurement range width R thereof satisfies the following equation (1), and a distance L from the axis line of the holding axis to a reference surface of the laser displacement meter satisfies the following equation (2).

$$R \geq (A-B)/2 \qquad (1)$$

$$F+(A-R)/2 \leq L \leq F+(B+R)/2 \qquad (2)$$

wherein, F denotes the reference distance of the laser displacement meter (distance from the reference surface to the center of the measurement range), A denotes the maximum width in the radial direction of the lens, and B denotes the minimum width in the radial direction of the lens.

The invention discussed above wherein the laser displacement meter may be installed such that the irradiation of a laser beam is made in a direction perpendicular to the axis line of the holding axis.

The invention discussed above may further include a second laser displacement meter which is installed such that the light projecting section for projecting a laser beam and the light receiving section for receiving a laser beam are aligned in a plane containing the axis line of the holding axis or are in a plane in parallel with the axis line of the holding axis, wherein, in the case where it is judged that a measured value acquired by the laser displacement meter is not a proper value, the measured value by the laser displacement meter is complemented by a measured value acquired by the second laser displacement meter at the same measurement position.

The invention discussed above wherein in the case where it is judged that a measured value by the laser displacement meter is not a proper value, measurement is executed before and after the measurement position thereof at smaller measurement intervals in the holding axis rotational direction.

The invention may be further related to a lens shape measuring method for measuring a peripheral shape of a lens, which is related to a lens shape measuring method for measuring a peripheral shape of a spectacle lens, including the steps of: holding the lens with a holding axis from the side of a lens surface; and changing a lens holding position without changing the axial direction of the holding axis, and causing a laser displacement meter to irradiate a laser beam to the lens periphery at each lens holding position and receiving a reflected light thereof and measure the peripheral shape of the lens, wherein, the irradiation of a laser beam and the receiving of a reflected light by the laser displacement meter are executed in a direction perpendicular to the axis line of the holding axis.

The invention discussed above wherein a second laser displacement meter may be provided for performing the irradiation of a laser beam and the receiving of a reflected light in a plane containing the axis line of the holding axis or in a direction parallel to the plane, and in the case where it is judged that a measured value acquired by the laser displacement meter is not a proper value, the measured value by the laser displacement meter is complemented by a measured value acquired by the second laser displacement meter at the same measurement position.

The invention wherein in the case where it is judged that a measured value by the laser displacement meter is not a proper value, measurement is executed before and after the measurement position at smaller measurement intervals in the holding axis rotational direction at the measurement position thereof.

The method of manufacturing a spectacle lens as discussed above, may include the steps of: measuring a peripheral shape of a spectacle lens after edging an uncut lens with use of the lens shape measuring apparatus; and comparing a measurement result thereof and a design value which has been created in advance so as to determine acceptance or rejection.

A manufacturing method of spectacles as discussed above, may manufacture spectacles by mounting, to a spectacle frame, an edged lens which is determined as acceptable by a method of manufacturing a spectacle lens.

Effect of the Invention

According to the invention as described above, the peripheral shape of the lens may be measured according to a non-contact technique with use of the laser displacement meter. Therefore, the peripheral shape of the lens can be measured easily and accurately, even in the case where the lens peripheral shape is complicated such as a case where a bevel and a groove are provided at the lens periphery. In addition, the light projecting section and the light receiving section of the laser displacement meter are installed such that they are aligned in a direction perpendicular to the axis line of the holding axis which holds the lens. Therefore, even in the case where, for example, the groove in the peripheral shape of the lens is deep or the bevel has a steep slope, reflected light can be received preferably and accordingly the peripheral shape of the lens can be accurately measured.

According to the invention as described above, the movement direction in the axial direction of the holding axis may be made opposite every time the rotational position of the holding axis is changed. Therefore, measurement can be speeded up.

According to the invention measurement may be completed at the stage where measurement cannot be made for the entire circumference of the peripheral shape of the lens. Therefore, measurement can be speeded up.

According to the invention as described above, the laser displacement meter may be selected and installed so that the conditions of the equation (1) and the equation (2) are satisfied. Therefore, even in the case of a lens with a shape having different widths depending on the direction such as a spectacle lens, the entire peripheral shape of the lens is within the measurement range of the laser displacement meter. Accordingly, the entire peripheral shape of the lens can be accurately measured by the laser displacement meter.

According to the invention as described above, a laser beam may be irradiated in a direction perpendicular to the axis line of the holding axis. Therefore, the distance from the axis line of the holding axis to the measurement position at the periphery of the lens can be easily calculated and thus measurement can be made easier.

According to the invention as described above, even in the case of the lens peripheral shape which cannot be favorably measured by the laser displacement meter which is installed such that the light projecting section and the light receiving section are aligned in a direction perpendicular to the axis line of the holding axis, the measurement can be complemented by a measured value by the second laser displacement meter in which the light projecting section and the light receiving section are aligned in a direction perpendicular to the alignment direction. Therefore, the peripheral shape of the lens can be accurately measured.

According to the invention as described above, even in the case where a proper measurement result cannot be obtained, the lens peripheral shape can be measured more accurately by executing measurement while reducing the measurement pitch. As a result of this, even at a measurement position where it is difficult to receive a reflected light, such as, for example, a sharp angle position at which the peripheral shape of the lens changes at a steep angle, the number of the measurement positions at which measurement is possible can be increased, the peripheral shape at the sharp angle position in the vicinity of the sharp angle position can be accurately determined through approximate calculation.

According to the invention as described above, the peripheral shape of the spectacle lens may be measured with use of the lens shape measuring apparatus as discussed above. Therefore, a spectacle lens having an accurately machined peripheral shape can be manufactured. In addition, it is possible to provide spectacles in which the spectacle frame and the spectacle lens are properly fitted with each other by mounting the spectacle lens having an accurately measured peripheral shape to the spectacle frame.

BEST MODE FOR CARRYING OUT THE INVENTION

Hereinafter, the best mode for carrying out the present invention will be described with reference to the drawings.

[A] The First Embodiment

FIG. 1 is a block diagram showing a control system according to a first embodiment of a lens shape measuring apparatus of the present invention. FIG. 2 is a perspective view showing a measuring apparatus body 110 of the lens shape measuring apparatus in FIG. 1. FIG. 3 is a magnified perspective view showing a part of FIG. 1.

A lens shape measuring apparatus 10 shown in FIGS. 1 and 2 measures a peripheral shape of a spectacle lens, in particular, a spectacle lens 1 (which will be hereinafter merely referred to as the lens 1) after the shape thereof is edged. It includes the measuring apparatus body 110, a displacement meter controller 62, and a control computer 50.

The measuring apparatus body 110 includes a lens holding mechanism section 12 (FIG. 2) and a plurality of, for example, two laser displacement meters 14A and 14B. The lens holding mechanism section 12 includes a holding axis 11 which holds the lens 1 by s sandwiching it from both sides of the lens surface, and has a function of rotating the lens 1 held by the holding axis 11 and moving it in the axial direction. Each of the laser displacement meters 14A and 14B irradiates a laser beam to the periphery of the lens 1 held by the lens holding mechanism section 12 and receives the reflected light thereof, thereby to measure the distance to the position on the lens at which the laser beam has been irradiated.

The displacement meter controller 62 controls the operation of the laser displacement meters 14A, 14B and outputs the measured data to the control computer 50.

The control computer 50 includes a measurement controller 15 (FIG. 1) as measurement control means and a data processor 16 (FIG. 1) as shape data generating means. The measurement controller 15 controls the operation of the lens holding mechanism section 12, measures the peripheral shape of the lens 1 with use of the laser displacement meters 14A and 14B, and stores a measurement result thereof. The data processor 16 generates or the like a peripheral shape data of the lens 1 based on the measurement result measured through measurement control of the measurement controller 15.

The peripheral-shape of the edged lens 1 to be measured includes, for example as shown in FIG. 4, a case where the lens 1 has a bevel 3 (a projecting portion engaged with a groove of a rim of a spectacle frame) on an edge surface 2 (FIG. 4A) and a case where the lens 1 has a groove 4 (into which a band section of the semi-rimless mount is fitted) (FIG. 4B). In addition, although not shown, the peripheral shape includes a case of a flat surface without convex or concave such as a bevel or a groove on the edge surface such as a lens for rim-less spectacles.

Measurement locations for the peripheral shape of the lens 1 includes, for example, a chamfer amount T, a width W1 of the edge surface 2 (W2 or W3 when chamfered), an inclination angle β of the edge surface (for example, the inclination angle with respect to the optical axis) and the like.

In addition, the measurement locations in the case where the lens 1 has the bevel 3 on the edge surface 2 includes a height H of the bevel 3, angles α1, α2 of the slope of the bevel 3, a position of the apex of the bevel 3 (which can be expressed, for example, as a distance P from a lens convex surface (front surface) 1A, or the ratio of the distance P with respect to the width of the edge surface) and the like. In addition, the measurement locations in the case where the groove 4 is provided on the edge surface 2 includes a depth D of the groove 4, a width E of the groove 4, a position of the groove 4 (for example, a distance Ga from the lens convex surface (front surface) 1A to a front-side opening end of the groove 4, a distance Gb1 from the periphery of a lens concave surface (rear surface) 1B to the rear-side opening end of the groove 4 (Gb2 or Gb3 when chamfered) and the like.

Further, as shown in FIG. 2, when it is assumed that the width direction of the apparatus is the X axis, the depth direction of the apparatus is the Y axis, and the vertical direction of the apparatus is the Z axis for the measuring apparatus body 110, the X axis is the axial direction of the holding axis 11, which is also referred to as the holding axis direction. The holding axis direction X coincides with the thickness direction of the lens 1 (FIG. 3), which is the measurement object. In addition, the rotational direction around the holding axis 11 is referred to as the holding axis rotational direction θ. Next, when the lens shape measuring apparatus 10 measures the peripheral shape of the lens 1, the position at the periphery is identified by the angle on the holding axis rotational direction θ, the position in the holding axis direction (thickness direction of the lens 1) X, and the position in the radial direction (r direction) from the holding axis of the lens 1.

In the meantime, as shown in FIG. 2, the lens holding mechanism section 12 includes a seat 17 which is arranged horizontally, a base 19 which is provided so that it can be displaced in the X axis direction with respect to the seat 17, and a frame 21 which is provided so that it can be displaced in the Z-axis direction with respect to the base 19.

A plurality of guide members 18 that are arranged in parallel to the X axis direction with respect to the seat 17 are fixed to the top surface of the seat 17. In addition, the base 19 is arranged slidably in the X axis direction along the guide members 18. A plurality of support pillars 20 are provided so as to stand in the Z-axis direction on the base 19. The frame 21 is passed through by the support pillars and arranged so that it can ascend and descend in the Z-axis direction.

The frame 21 has a U-shape having a pair of arms 211, 212 that are located at intervals and projecting toward the front. The pair of arms 211, 212 are rotatably supported by the holding axis 11. A screw which is not shown is provided between both guide members 18 on the top surface of the seat 17 so as to be rotatable around the X axis direction. One end of the screw is coupled to an X-axis motor 23 via a gear and a cogged belt (belt with gear) 22, and the screw is rotated through rotation of the X-axis motor 23. An internal thread, which is not shown, having a thread axis along the X axis direction is fixed to the bottom surface of the base 19, and is screwed into the screw. Therefore, when the screw is rotated by driving the X-axis motor 23, the internal thread is displaced in the X axis direction. Accordingly, the base 19 to which the internal thread is fixed is moved in the X axis direction.

Further, a Z-axis motor 24 is installed on a back-surface side of a frame 21 in the base 19. Driving force of the Z-axis motor 24 is transmitted via a gear and a cogged belt 25 to a screw 26. The screw 26 is screwed passing through the frame 21 in the vertical direction. As a result, driving of the Z-axis motor 24 causes the frame 21 to ascend and descend in the Z-axis direction.

The holding axis 11 for holding the lens 1 includes a support axis 11A and a presser axis 11B that are coaxially arranged. The lens 1 is sandwiched by the support axis 11A and the presser axis 11B from both lens surface (the lens convex surface 1A and the lens concave surface 1B) sides whereby the lens 1 is held by the holding axis 11.

A lens chuck motor 27 is installed in the frame 21. Driving force of the lens chuck motor 27 is transmitted via a gear and a cogged belt 28 to a gear 29. An internal thread (not shown) is formed on the inner periphery of the gear 29. An external thread (not shown) screwed into the internal thread is formed on the outer periphery of a driving member 30. The driving member 30 is screwed into the inner side of the gear 29.[C8] The driving member 30 rotatably supports an end portion of the presser axis 11B and thereby to restrict the position in the X axis direction of the presser axis. Therefore, when the lens chuck motor 27 is driven, then the internal thread of the above-described gear 29 and the external thread of the above-described driving member 30 act on each other, the driving member 30 is displaced in the X axis direction, and in accordance with this the presser axis 11B is moved in the X axis direction. When the lens is held, the presser axis 11B is moved toward the support axis 11A, and whereby the lens 1 is held in such a manner that it is sandwiched from both lens surface sides between the presser axis 11B and the support axis 11A. Note that, the presser axis 11B is supported by the driving member via an elastic member, which makes temporary fixation of the lens 1 and adjustment of the sandwiching pressure easier.

Further, a holding axis rotation motor 31 is installed in the frame 21. Driving force of the holding axis rotation motor 31 is transmitted via unillustrated gear, cogged belt or the like to the support axis 11A and the presser axis 11B synchronously, and rotates the support axis 11A and the presser axis 11B synchronously. As a result of this, the lens 1 held in a manner sandwiched by the support axis 11A and the presser axis 11B is rotated in the holding axis rotational direction θ. In addition, the support axis 11A and the presser axis 11B, in other words, the holding axis 11 is moved in the X axis direction via the base 19 through driving of the X-axis motor 23. Therefore, the lens 1 held by the holding axis 11 is moved in the holding axis direction X.

As described above, the lens holding mechanism section 12 has a portion which includes the above-described holding axis 11 (the support axis 11A and the presser axis 11B) and the lens chuck motor 27, the above-described guide member 18, the X-axis motor 23, the holding axis rotation motor 31 and the like. The portion holds the lens, rotates it around the holding axis, and moves it in the holding axis direction.

On the above-described seat 17, the laser displacement meters 14A and 14B are installed via a bracket 33 at the position opposing the holding axis 11. As a displacement meter, an optical displacement meter capable of measuring the amount of displacement or the distance can be used in a non-contact manner. The edged spectacle lens[C9] is formed into a wide and generally horizontal long shape in the front view, with a large difference between the maximum width and the minimum width. Accordingly, a displacement meter capable of measurement distantly with a wide measurement range is preferable. In addition, it is also preferable that the measurement accuracy thereof be high (preferably within +15 μm) so that whether or not the lens can be fitted into the spectacle frame can be judged based on the measurement result. Therefore, the laser displacement meter according to the triangulation method is preferable because of its long measurement distance and a wide measurement range. In addition, a laser beam of a spot type should be preferably irradiated because of high measurement accuracy. In addition, a light-receiving system of a diffuse reflection type is preferable because in many cases the periphery of the lens is matte since it is formed by grinding processing. As the laser displacement meters 14A and 14B according to the present embodiment, laser displacement meters which correct[C10] a laser beam of a spot type, based on the triangulation method as the measurement principle, in accordance with the light-receiving system as diffuse reflection type are used.

Each of the laser displacement meters 14A and 14B, as shown in FIG. 5, includes a light projecting section 34 and a light receiving section 35. The light projecting section 34, including a semiconductor laser 36 as a light-emitting element and a projecting lens 37, condenses laser beams from the semiconductor laser 36 through the projecting lens 37, and irradiates the laser beams via a light projecting window 38 to a measurement object 40.

The above-described light receiving section 35, including an optical position detection element 41 and a light-receiving lens 42, focuses reflected light diffused and reflected by the measurement object 40 onto the optical position detection element 41 in a spot-like form, after having the reflected light to pass through a light-receiving window 43 and the light-receiving lens 42. When the measurement object 40 is displaced from a position M0 which is separated from a reference surface 46 set in the laser displacement meter by the amount equivalent to a reference distance F toward a position M1 which is closer to the position M0 and a position M2 which is further from the position M0, respectively, the focus position on the optical position detection element 41 is moved. Therefore, the amount of displacement from the laser displacement meters 14A, 14B to the measurement object 40 is measured according to the principle of triangulation. In the present embodiment, as shown in FIG. 3, the laser displacement meters 14A and 14B irradiate a laser beam on the edge surface 2 of the lens 1, which is the measurement object, and receive the reflected light thereof to measure the amount of displacement. Accordingly, the distance from the laser displacement meters 14A, 14B to the edge surface 2 of the lens 1 is measured. Since the laser displacement meters 14A, 14B are respectively installed at a predetermined distance from an axis line 45 of the holding axis 11 in a predetermined orientation, the distance from the axis line 45 of the holding axis 11 in the radial direction (r direction) can be calculated based on the measured amount of displacement. In addition, since the lens is rotated by the holding axis 11, the distance in the radial direction can be measured at each angle of the lens can be measured through measurement of the amount of displacement at each of the different rotation angles.

As shown in FIGS. 3 and 6A, the above-described laser displacement meter 14A is installed such that the light projecting section 34 and the light receiving section 35 are aligned in the direction perpendicular to the axis line 45 of the holding axis 11. The laser displacement meter 14A arranged in the perpendicular direction as described above is preferable for measurement of the peripheral shape of the lens 1 having a structure with convexes and concaves or slopes which are successively formed in the circumferential direction, such as the bevel 3 and the groove 4. Meanwhile, as shown in FIGS. 3 and 6B, the laser displacement meter 14B is installed such that the light projecting section 34 and the light receiving section 35 are aligned in a plane containing the axis line of the holding axis 11. The laser displacement meter 14B installed as such is preferable for measurement of a structure in which the shape of the convexes and concaves or the slope changes in the circumferential direction. In particular, as shown in FIG. 8A, the laser displacement meter 14B is preferable for measurement of a sharp angle position 44 or the like, at which the peripheral shape of the lens 1 changes at a steep angle. The measured data are acquired through measurement by the laser displacement meters 14A and 14B at an identical position on the edge surface 2 of the lens 1. In the case where one of the measured values (for example, the value measured by the laser displacement meter 14A) is not properly acquired (that is, if a measured value is not acquired, if a measured value out of the measurement range is acquired, if a measured value is considered apparently strange based on the measured values for the surrounding positions, or the like), the measured value should be complemented by a measured data measured by the other (for example, the laser displacement meter 14B). Note that, in the present embodiment, in the case where the measured value by the laser displacement meter 14A is not properly acquired, the measured value is complemented by the measured value by the laser displacement meter 14B, and the measured value by the laser displacement meter 14B is considered as the measured value by the laser displacement meter 14A. In addition, in the present embodiment, the laser displacement meters 14A, 14B are arranged such that a laser beam from the light projecting section 34 is irradiated so as to be perpendicular to the axis line of the holding axis. By doing this, it becomes easier to receive the reflected light, and it also becomes easier to identify the measurement position to which a laser beam is irradiated and to calculate the distance from the axis line of the holding axis. Therefore, the embodiment is preferable because computation processing or the like for the measured value is made easier.

As shown in FIG. 3, the laser displacement meters 14A and 14B are adjusted so that laser beams irradiated from them intersect with each other on the axis line 45 of the holding axis 11. In addition, the angle at which the laser beams intersect with each other on the axis line 45 of the holding axis 11, that is, an angle δ at which the laser displacement meters 14A and 14B are arranged (that is, arrangement angle) is set to a predetermined value. In the present embodiment, a mount position on the bracket is adjusted so that laser beams irradiated from the laser displacement meters 14A and 14B intersect with each other on the axis line 45 at a predetermined arrangement angle δ. In addition, in order to align the intersecting position of the laser beams from the laser displacement meters 14A and 14B on the axis line 45, it is also possible to adjust the position of the holding axis 11 in the Z-axis direction by driving the above-described Z-axis motor (FIG. 2) to cause the frame 21 to ascend and descend. In addition, it is also possible to provide a mechanism for moving the holding axis 11 in the Y-axis direction in the lens holding mechanism section 12, so as to enable adjustment of the position of the holding axis 11 in the Y-axis direction.

In addition, both the laser displacement meters 14A and 14B are installed (or the models thereof are selected) under the condition where the equation (1) and the equation (2) as follows are satisfied with respect to the lens 1 held by the holding axis 11. That is, as shown in FIG. 7, when it is assumed that the measurement range width of the laser displacement meters 14A, 14B is R, the distance from the axis line of the holding axis 11 to the reference surface 46 of the laser displacement meter in the laser displacement meters 14A, 14B is L, the reference distance of the laser displacement meters 14A, 14B (the distance from the reference surface of the laser displacement meter to the central position of the measurement range width R) is F, the maximum width in the radial direction of the lens 1 is A, and the minimum width in the radial direction of the lens 1 is B. In this case, it is preferable that the laser displacement meters 14A, 14B be installed such that, the above-described measurement range width R satisfies:

$$R \geq (A-B)/2 \qquad (1)$$

and the above-described distance L satisfies:

$$F+(A-R)/2 \leq L \leq F+(B+R)/2 \qquad (2).$$

The equation (1) is the condition for the difference in the distance between when the periphery of the lens 1 rotated by the holding axis 11 becomes the furthest and when it becomes the closest from the laser displacement meter to be within the measurement range width R of the laser displacement meters 14A, 14B. In addition, the equation (2) is the condition for installing the laser displacement meter so that the edge surface of the lens 1 is within the measurement range of the laser displacement meter, both when the edge surface of the lens 1 rotated by the holding axis 11 is the furthest from the laser displacement meter, and when it is the closest. Note that, in FIG. 7, the position with the longest measurement distance within the measurement range of the laser displacement meter is expressed as R1, and the position for the shortest measurement distance is expressed as R2.

By selecting such laser displacement meters and installing them, the entire peripheral shape of the lens can be easily set so that it is within the measurement range of the laser displacement meter. Note that the radial direction maximum dimension A and the radial direction minimum dimension B of the lens 1 are preferably determined taking into account the dimensions of a lens with the maximum width in the horizontal direction and a lens with the minimum width in vertical direction, the lenses being measurement objects candidates. For example, the maximum width in the radial direction A may be set to 80 mm, and the minimum width in the radial direction B may be set to 15 mm. Instead, A may denote the maximum width in the horizontal direction, and B may denote the minimum width in the vertical direction.

A laser beam, from each of the laser displacement meters 14A, 14B that are installed as described above, as shown in FIG. 2, changes an irradiation position (measurement position) with respect to the lens 1, by driving the X-axis motor 23 so as to move the lens 1 in the holding axis direction X via the holding axis 11, and by driving the holding axis rotation motor 31 so as to rotate the lens 1 in the holding axis rotational direction θ via the holding axis 11. It is preferable that either one of the two methods for changing an irradiation position of a laser beam is employed.

As shown in FIG. 3, the first irradiation position change method moves the lens 1 in the holding axis direction X (the thickness direction of the lens 1) at each rotational position around the holding axis 11 on the edge surface 2 of the lens 1 so as to move the irradiation position of a laser beam in the holding axis direction X, and, at each irradiation position; and measures the displacement amount in the radial direction at each position in the holding axis direction X on the edge surface 2 of the lens 1 to measure the peripheral shape of the lens 1. In this irradiation position change method, it is preferable that the movement orientation of the lens 1 in the holding axis direction X be changed to the opposite direction every time the rotational position around the holding axis 11 is moved. This is because unnecessary movement of the lens holding mechanism section 12 is reduced in the holding axis direction X, as a result of which the measurement time can be shortened.

The second irradiation position change method rotates the lens 1 in the holding axis rotational direction θ at each position in the holding axis direction X on the edge surface 2 of the lens 1 so as to move the irradiation position of a laser beam in the holding axis rotational direction θ; and measures, at each irradiation position, the displacement amount at each position in the radial direction in the holding axis rotational direction θ on the edge surface 2 of the lens 1 so as to measure the peripheral shape of the lens 1. In this irradiation position change method, when the position of the lens 1 is displaced in the holding axis direction X and a laser beam is scanned in the holding axis rotational direction θ, there is a case where although the displacement amount in the radial direction of the periphery of the lens 1 can be measured for the entire circumference or a part of the circumference before it is displaced, it is judged that the displacement amount in the radial direction of the periphery of the lens 1 cannot be measured for the entire circumference. In this case it is deemed that a laser beam is deviated from the periphery of the lens 1, that is, deviated from the positions AO, BO (B2, when chamfered) at which the edge surface 2 of the lens 1 intersects with the lens surface on the convex side (lens front surface) 1A and the lens surface on the concave side 1B (lens rear surface) (FIG. 4), and accordingly the measurement is terminated.

In the meantime, the above-described judgment is made when improper measured values are measured for the entire circumference, such as when a measurement result out of the measurement range is generated, when the distance of the periphery of the holding axis is measured, or the like. Note that, it is more reliable that such judgment is made if the lens is moved further in the X axis direction after such measurement result is generated after such initial measurement result is made, and thereafter the same result is generated after a measurement is made again.

Next, the control system of the lens shape measuring apparatus 10 will be explained.

As shown in FIG. 1, the lens shape measuring apparatus 10 includes a control computer 50. The control computer 50 includes display means 51 such as a CRT display, a panel display or the like, input means 52 such as a key board and mouse, an operation panel (which may also serve as display means) and the like, a data storage section 53 such as a memory, a hard disk, and the like, a motor controller 54 for controlling various motors via respective drivers, and a measured value A/D conversion board 55 for converting the measured value fed from the laser displacement meters 14A, 14B via the displacement controller 62 from an analog quantity to a digital quantity. The control computer 50 further includes the measurement controller 15 and the data processor 16.

The above-described measurement controller 15 includes a measurement control program 56 and a fine measurement control program 57. The measurement control program 56 controls the X-axis motor 23, the Z-axis motor 24, the lens chuck motor 27 and the holding axis rotation motor 31 for driving them in order to measure the peripheral shape of the lens 1. The fine measurement control program 57 controls the X-axis motor 23 and the holding axis rotation motor 31 for driving them in order to make fine measurement (measurement at smaller measurement intervals) of the peripheral shape of the lens 1. In accordance with the measurement control program 56 or the fine measurement control program 57, the measurement controller 15 causes the motor controller 54 to output a control command so as to control the X-axis motor 23 for driving it via a driver 58, control the Z-axis motor 24 for driving it via a driver 59, control the lens chuck motor 27 for driving it via a driver 60, and control the holding axis rotation motor 31 via a driver 61.

Note that, in the measurement in accordance with the fine measurement control program 57, the measurement interval in the holding axis rotational direction θ is set smaller than the measured value in accordance with the measurement control program 56. For example, while the measurement interval in the holding axis rotational direction θ in accordance with the measurement control program 56 is 1 degree, the measurement pitch in the holding axis rotational direction θ in accordance with the fine measurement control program 57 is set to, for example, 0.1 degree.

Further, the laser displacement meters 14A, 14B execute measurement based on a measurement command (for example, in what measurement intervals in seconds at which measurement is to be executed, e.g. at intervals of 200μ second) given by the displacement meter controller 62. The measured data in the analog quantity is sent from the laser displacement meters 14A, 14B via the displacement meter controller to the measured value A/D conversion board at the thus set intervals. When the motor controller 54 receives an actuating signal (for example, pulse signal) from the X-axis motor 23 or the holding axis rotation motor 31 and recognizes completion of the movement to each lens holding position at which the amount of displacement is measured, the motor controller 54 sends a signal to the measured value A/D conversion board. Then, the measured value A/D conversion board which has received the signal converts the measured data at that point to a digital quantity. The measurement controller 15 associates the measured value converted into the digital quantity with the information on the lens holding position acquired from the motor controller 54, and stores it in the data storage section 53. That is, the above-described measured data in the radial direction is arranged and stored as the measured data at each angle in the holding axis rotational direction θ of the periphery of the lens 1 and at each position in the holding axis direction X that are calculated based on the actuating signal.

The data processor 16 includes a shape data generation program 63, a measurement error judgment program 64, a fine measurement data processing program 65, a circumference computation program 66, and an acceptance/rejection judgment program 67.

The shape data generation program 63 is a program for generating the peripheral shape data of the lens 1 with use of the measured data stored in the data storage section 53. Examples of graphs on which the peripheral shape data generated by the shape data generation program 63 are plotted are shown in FIGS. 9 and 10. FIG. 9 is a graph showing a case of measuring a lens in which a bevel is formed on the lens edge surface. The graph shows the measured values and theoretical values of the radial direction position with respect to the lens thickness direction position at a certain rotation angle of the holding axis. In FIG. 9, the solid line shows the peripheral shape of the lens 1 generated from the measured data by the laser displacement meter 14A, from which it is understood that the peripheral shape of the lens 1 having the bevel substantially coincides with theoretical value (shown by the dotted line in FIG. 9).

Further, FIG. 10 is a graph showing a case measuring a lens in which the groove is formed on the lens edge surface. The graph shows the measured values (the measured values by the laser displacement meters 14A and 14B, respectively) and theoretical values of the radial direction position with respect to the lens thickness direction position at a certain rotation angle of the holding axis. In FIG. 10, the solid line plots the measured data by the laser displacement meter 14A, and the dashed-dotted line plots the measured data by the laser displacement meter 14B. It is understood from the graph that the peripheral shape having the groove of the lens 1 generated by the measured data by the laser displacement meter 14A is substantially coincides with theoretical value (shown by the dotted line in FIG. 10), compared with the case with the laser displacement meter 14B. That is, in this example, in the case of the measured values by the laser displacement meter 14B, there are some portions at the groove portion at which measurement was not made accurately. This is an example of a case affected by the fact that the light irradiated from the light emission section is shielded by the wall surface of the groove and thus adequate light does not reach the light receiving section because the laser displacement meter 14B is arranged in the direction perpendicular to the lens holding axis.

Further, the shape data generation program creates a three-dimensional shape data of the lens peripheral shape based on the measured data.

Further, the shape data generation program calculates various measured data based on the measurement result as shown in FIG. 4.

The above-described measurement error judgment program 64 as shown in FIG. 1 is a program for judging whether or not a measurement error has occurred because the measured data by the laser displacement meters 14A and 14B stored in the data storage section 53 are not properly acquired. For example, at the sharp angle position (the position at which the peripheral shape changes at a sharp angle) 44 of the peripheral shape of the lens 1 as shown in FIG. 8A, there are some cases where the reflected light is shielded by the lens distal end portion, which is the sharp angle position 44, and thus it is not received by the laser displacement meters 14A, 14B. Further, there are some cases where a laser beam is not reflected, and thus the laser displacement meters 14, 14B cannot receive adequate reflected light also in the case where the periphery of the lens 1 is a polished surface (mirror surface).

The cases where the measured data is not a proper value include a case where the measured value is not acquired by the laser displacement meter, a case where a value out of the measurement range is generated, a case where an unlikely measured value is generated taking into consideration the values preceding and subsequent values, or the like. Whether or not these values are proper values is made based on the surrounding measured values. In the case where it is judged by the measurement error judgment program that the measured value is not a proper value, a fine measurement program 65 is executed.

For example, in FIG. 8A, the lens 1 is rotated around the holding axis 11, a laser beam is scanned in the holding axis direction X at each angle $\theta 1, \theta 2, \theta 3, \theta 4, \theta 5, \ldots$ in the holding axis rotational direction $\theta$, and displacement in the radial direction (r direction) of the periphery of the lens 1 is measured in the holding axis direction X at each angle position $\theta 1, \theta 2, \theta 3, \theta 4, \theta 5, \ldots$. At this time, there is a case where, at the angles $\theta 4, \theta 5$ which is the preceding angle and the subsequent angle of the angle $\theta 3$ corresponding to the sharp angle position 44, an appropriate number of the displacements in the radial direction of the periphery of the lens 1 can be measured in the holding axis direction X, and, at the angle $\theta 3$, where an appropriate number of the displacements in the radial direction of the periphery of the lens 1 cannot be measured in the holding axis direction X. In this case, the measurement error judgment program 64 judges that a measurement error has occurred if the difference between the number of the measured data at the angle $\theta 3$ and the number of the measured data at the preceding angle $\theta 2$ is equal to or greater than a threshold value.

If it is judged that a measurement error has occurred as described above, fine measurement is executed, in accordance with the fine measurement control program 57 of the measurement controller 15, in which the measurement pitch in the holding axis rotational direction $\theta$ is set smaller than the measurement pitch in the holding axis rotational direction $\theta$ in accordance with the measurement control program 56. The fine measurement is executed at a measurement interval between the preceding angle position and the subsequent angle position (the measurement interval in accordance with the measurement control program 56) in the rotational direction of the angle position in the holding axis rotational direction $\theta$ at which it is judged that a measurement error has occurred. For example, at the sharp angle position 44 (which corresponds to the angle $\theta 3$ in the holding axis rotational direction $\theta$) in FIG. 8A, fine measurement at smaller measurement pitches is executed between the preceding angle $\theta 2$ and the subsequent angle $\theta 4$ of the angle $\theta 3$ is executed. For example, as shown in 8B, fine measurement of the periphery of the lens 1 is executed at the angles $\theta 2, \theta 21, \theta 22, \theta 23, \theta 24, \theta 3, \theta 31, \theta 32, \theta 33, \theta 34$ and $\theta 4$. Note that, in the case of this example, fine measurement may be omitted since the first measurement can be made property at $\theta 2$ and $\theta 4$.

The measured data in the radial direction of the periphery of the lens 1 acquired by the fine measurement as described above is stored in the data storage section 53 as shown in FIG. 1. The fine measurement data processing program 65 as shown in FIG. 1 is a program for performing approximate computation of the shape at the position at which a measurement error has occurred based on the measured data of the periphery of the lens 1 which is acquired by fine measurement processing and which is stored in the data storage section 53. For example, FIG. 8B shows the measured data in the holding axis rotational direction $\theta$ at an arbitrary position in the holding axis direction X among the measured data of the peripheral shape of the lens 1. The fine measurement data processing program 65 determines an approximate curve 68 through approximate computation for example from the measured data in the radial direction r2, r21, r22, r23, r24, r31, r32, r33, r34, r4 at each angle θ2, θ21, θ22, θ23, θ24, θ31, θ32, θ33, θ34, θ4 in the holding axis rotational direction θ, and calculates the radial direction position r3 of the periphery of the lens 1, at the angle θ3, that is, at the sharp angle position 44, from the approximate curve 68.

The shape data of the position where a measurement error has occurred which is obtained by the fine measurement data processing program is transferred to the shape data generation program 63, in accordance with which the three-dimensional shape data of the lens peripheral shape is created and various measured data are calculated.

The above-described circumference computation program 66 is a program for computing the circumference of the lens 1 from the three-dimensional shape data of the periphery of the lens 1 generated by the shape data generation program 63. For example, the circumference of the lens 1 is calculated from the data of the apex of the bevel 3.

Further, the above-described acceptance/rejection judgment program 67 is a program for judging whether or not the peripheral shape data of the lens 1 generated by the shape data generation program 63 is acceptable by comparing it with the design data of the peripheral shape of the lens 1. For example, it judges acceptance or rejection based on whether or not the data is within an acceptable range which has been set in advance for the design data.

The measurement results to be used for the acceptance/rejection judgment include, as shown in FIG. 4, the chamfer amount T, the width W1 (W2 or W3, when chamfered) of the edge surface 2, the inclination angle β of the edge surface, the height H of the bevel 3, the angles α1, α2 of the slope of the bevel 3, a position P from the lens convex surface (front surface) 1A of the apex of the bevel 3 (or the ratio of the position P with respect to the width of the edge surface), the depth D of the groove 4 (D1, D2, when the lens edge surface is inclined), the width E of the groove 4, a position Ga separated from the lens convex surface (front surface) 1A of the groove 4, a position Gb1 (Gb2 or Gb3, when chamfered) separated from the lens concave surface (rear surface) 1B. It is preferable that these measured data be compared with the design data, and the data be judged as rejected the data is out of the acceptable range which has been set in advance.

The design data of the peripheral shape of the above-described lens 1 is created in advance based on, for example, the description of the order received by a plant 100 of a lens manufacturer from a client such as an optician's store 70 or the like. FIG. 1 shows one example of a schematic configuration of an online spectacle lens order-receiving system. In the optician's store 70 as an example of an orderer, the frame shape measuring apparatus 72 of a spectacle frame and a terminal computer 71 as a computer serving as an online ordering terminal. The terminal computer 71 is a terminal for transmitting various information which is necessary for ordering a spectacle lens to the plant 100 of the lens manufacturer as an example of an order receiver. The terminal computer 71 includes communication means and thus can be connected to a server 73 of the plant 100 via a communication medium 74. The communication medium is not limited in particular. For example, it can use a public network, a dedicated line, the Internet or the like as the communication medium. When the order data is sent from the terminal computer 71 to the server 73 of the plant 100, the order data is order-receiving processed in accordance with an ordering-reception processing program registered on the server 73 to create the order receipt data, and is stored in a storage means 75. The order receipt data includes information on the lens, the information on the spectacle frame, a prescription value, layout information or the like. The information on the lens includes the information on the lens type (a lens material, a refractive index, an optical design of the front and rear surfaces of the lens, or the like), the information on the lens machining and supporting (a lens thickness, an edge-thickness, decentering, a finishing method of the edge surface, the machining type and method of the frame mounting portion, dyeing, coating or the like). The information on the spectacle frame, includes a frame size, a frame material, a color, a lens shape (the shape data of the lens frame measured by the frame shape measuring apparatus, and a lens shape which has been set in advance such as the rim-less frame, a groove frame) or the like. The above-described prescription values include a spherical power, a cylindrical power, a cylinder axis, a prism, an addition refractive power, or the like. The layout information includes an interpupillary distance, a left or right monocular interpupillary distance, a near vision interpupillary distance, a segment position, an eye-point position, or the like.

A program for designing a shape of the lens is installed in the above-described plant server 73. A desired lens shape (including the peripheral shape data) is calculated based on the order receipt data as described above, and on data (the optical surface shape, the lens shape or the like) which is necessary for designing and which has been stored in the storage means 75, and the desired lens shape is stored in the storage means 75 as the design data.

Further, a machining data creation program for setting various machining conditions based on the above-described order receipt data or the above-described design data is also provided in the above-described plant server 73, and the thus created machining data is stored in the storage means 75. Next, the uncut lens is edged based on the design data and the machining data. When the peripheral shape of the edged lens is measured and acceptance or rejection is judged, the design data is imported from the plant server 73 to the control computer 50 of the lens shape measuring apparatus 10. Note that, a conventional technology can be applied for various apparatuses necessary for manufacturing a lens. Therefore, the description thereof will be omitted in FIG. 1.

Next, the procedure for measuring the peripheral shape of the lens 1 with use of the lens shape measuring apparatus 10 will be explained with reference to FIGS. 1, 11 and 12. FIG. 11 is a chart showing a flow of the measurement procedure in a first example, in which the measurement position is moved in the holding axis direction X at each holding axis rotation angle. Meanwhile, FIG. 12 is a chart showing a flow of the measurement procedure in a second example, in which the measurement position is moved in the holding axis rotational direction at each the holding axis direction X position.

(1-a) When the Measurement Position is Moved in the Holding Axis Direction X at Each Holding Axis Rotation Angle (1-a-1) The Radial Direction Displacement Measurement Process (Steps S1 to S7)

As shown in FIG. 11, first, the operator sets a lens holder mounted on the lens surface on the convex side (lens front surface) 1A of the lens 1 (not shown, a lens holder which has been mounted when the lens is edged may instead be used) to the support axis 11A of the holding axis 11 in the lens shape measuring apparatus 10 (S1). Next, the operator performs an operation for starting a lens holding operation by means of the input means 52 of the control computer 50, the measurement control section 15[Y12] of the control computer 50 drives the lens chuck motor 27 via the motor controller 54 based on the measurement control program 56, moves the presser axis 11B toward the support axis 11A side, and chucks the lens 1 to the holding axis 11 so as to hold it (S2). Note that the position of the origin of the holding axis 11 is defined as a position when the position at the distal end of the lens holder mounted to the support axis 11A (an intersecting position of the lens front surface 1A and the axis line 45) coincides with a position to which a laser beam is irradiated from the laser displacement meters 14A, 14B. If the holding axis 11 is not at the position of the origin after the above-described lens chucking is completed, the measurement control section 15[C13] drives the X-axis motor 23 via the motor controller 54 so as to move the holding axis 11 to the position of the origin.

When the operator performs an operation for starting measurement by means of the input means 52 of the control computer 50, the measurement controller 15 sets the orientation of the movement of the lens 1 held by the holding axis 11 in the holding axis direction X to the positive direction (S3). In addition, the displacement meter controller 62 outputs a command to the laser displacement meters 14A and 14B to start the operation, thereby to actuate the laser displacement meters 14A and 14B.

In the measurement controller 15, a set amount (for example, 10 mm), which is a scanning distance of a laser beam by the laser displacement meter (the movement distance in the X axis direction of the holding axis during measurement operation) has been set in advance. The measurement controller 15 drives the X-axis motor 23 via the motor controller 54 so as to move the holding axis 11 from the above-described position of the origin in the positive direction of the holding axis direction X by the above-described set amount. As a result of this, the lens 1 is moved in the positive direction of the holding axis direction X by the set amount without changing the rotation angle position (S4). Note that it is preferable that the above-described set amount is set as appropriately corresponding to the edge thickness of the lens 1 to be measured, because unnecessary movement can be reduced and the measurement time can be shortened.

In the above-described step S4, while the holding axis 11 is moved in the positive direction of the holding axis direction X by the set amount, every time the measurement controller 15 detects that the holding axis 11 has moved for a designated interval which has been set in advance (for example, at every 0.1 mm in the holding axis direction X) based on an actuating signal (pulse signal) of the X-axis motor 23 it has acquired from the motor controller 54, it outputs a measurement command signal to the displacement meter controller 62. Every time the displacement meter controller 62 receives the above-described measurement command signal, it acquires the measured values from the laser displacement meters 14A and 14B, and outputs the thus acquired measured values to the measured value A/D conversion board 55 of the control computer 50. The measured value A/D conversion board 55 which has received the measured values converts the measured values into digital quantity (S5). The measurement controller 15 associates the measured value converted into digital quantity with the angle in the holding axis rotational direction θ and the position in the holding axis direction X when the measured value is measured, and stores them in the data storage section 53 as the radial direction measured data (S6).

When the movement of the lens 1 in the holding axis direction X by the set amount is completed, the measurement controller 15 judges whether or not the radial direction measured data has been measured for 360° in the holding axis rotational direction θ (S7). If measurement has not been made, the measurement controller 15 advances to step s8. In step S8, the measurement controller 15 drives the holding axis rotation motor 31 via the motor controller 54 so as to rotate the holding axis 11 in the holding axis rotational direction θ by a predetermined pitch angle Δθ (for example, Δθ=1 degree). Subsequently, the measurement controller 15 sets the movement orientation of the lens 1 held by the holding axis 11 in the holding axis direction X to a direction opposite to that in the previous measurement (S9). Subsequently, the measurement controller 15 executes the procedures from steps S4 to S6 so as to measure the displacement in the radial direction of the periphery of the lens 1 with use of the laser displacement meters 14A and 14B. The procedures in steps S7, S8, S9, S4, S5 and S6 are repeatedly executed until it is judged in step S7 that measurement has been made for 360° in the holding axis rotational direction θ.

The radial direction measured data which have been acquired as described above are specifically the values (VAn, VBn, Xn) (n=1, 2, 3, ..., N) at each angle θm (m=1, 2, 3, ..., M) in the holding axis rotational direction θ. Herein, M denotes the number of measurements while the holding axis is rotated one revolution in the holding axis rotational direction, VAn denotes the measured value by the laser displacement meter 14A (the distance from the reference surface 46 for the laser displacement meter 14A to the lens edge surface), VBn denotes the measured value by the laser displacement meter 14B (the distance from the reference surface 46 for the laser displacement meter 14B to the lens edge surface), Xn denotes the position in the holding axis direction X, and N denotes the number of measurements within the set amount.

If it is judged in the above-described step S7 that the measurement controller 15 has measured the displacement in the radial direction of the periphery of the lens 1 by the amount equivalent to 360 degrees, the data processor 16 converts the angle in the holding axis rotational direction θ so that the angles in the holding axis rotational direction θ at the same measurement positions on the lens by the laser displacement meters 14A and 14B coincide with each other, while taking into consideration the arrangement angle δ between the laser displacement meters 14A and 14B for the radial direction measured data stored in the data storage section 53, and creates the radial direction measured data for the respective laser displacement meters 14A and 14B. The specific radial direction measured data created herein for each laser displacement meter are (VAn, Xn, θm) (n=1, 2, 3, ..., N) (m=1, 2, 3, ..., M) for the radial direction measured data by the laser displacement meter 14A, and (VBn, Xn, (θm+δ)) (n=1, 2, 3, ..., N) (m=1, 2, 3, ..., M) for the radial direction measured data by the laser displacement meter 14B. Note that, this example shows a case where the angle of the laser displacement meter 14B is converted, assuming that the angle θm in the holding axis rotational direction θ is the angle for the laser displacement meter 14A.

(1-a-2) The Measured Data Complement Process (Steps S10 to S11)

Next, the data processor 16 of the control computer 50 compares the radial direction measured data for the laser displacement meters 14A and 14B at a certain angle in the holding axis rotational direction θ (hereinafter, referred to as a designated angle) among the radial direction measured data by the above-described laser displacement meter 14A and the laser displacement meter 14B (S10).

Next, as a result of comparison, if there is a case where a measured data is not properly acquired by the laser displacement meter 14A but a measured data is properly acquired by the laser displacement meter 14B at the same position in the holding axis direction X, at the same angle in the rotating direction θ of the holding axis, and the value is complemented by the measured value by the laser displacement meter 14B as the data by the laser displacement meter 14A (S11). Note that, in the present embodiment, the data by the laser displacement meter 14A is prioritized, and then it is supplemented by the data by 14B. This is because, since the laser displacement meter 14A is suitable for[Y14] measuring a shape continuing in the circumferential direction such as the bevel and the groove, while the laser displacement meter 14B is more suitable for a case, for example, where the lens edge surface changes at a sharp angle such as a steep angle, and therefore, the measured value is supplemented by the laser displacement meter 14B only at such position. Specifically, in the case where there is no radial direction measured data by the laser displacement meter 14A but there is a radial direction measured data by the laser displacement meter 14B at each position in the holding X axis at the above-described designated angle, the data processor 16 employs the radial direction measured data by the laser displacement meter 14B as the data by the laser displacement meter 14A at the position (S11).

(1-a-3) The Measurement Error Judgment Process (Step S12)

Next, the data processor 16 judges whether or not a measurement error has occurred in the radial direction measured data by the laser displacement meter 14A at the designated angle in accordance with the measurement error judgment program 64. A measurement error sometimes occurs during the measurement in the vicinity of a place where the lens edge surface changes at a sharp angle such as the steep angle as described above. In such vicinity of a steep angle, there are some cases where the measured data is not acquired, or a fewer number of the measured data is acquired than that at other adjacent measurement positions. Accordingly, as for detecting a measurement error due to a steep angle, a judgment may be made by comparing the numbers of the measured data between at the designated angle and at an angle adjacent thereto (for example, the designated "angle $-\Delta\theta$" [C15]), and determining a judgment criteria (threshold) based on the difference or the ratio of the numbers of the data. In this example, an explanation is given on the case where a judgment is made based on the difference in the number of the data. The difference in the numbers of the measured data in the vicinity of the steep angle is measured through experiment with use of a lens having a steep angle, and the judgment condition (threshold) is determined in advance. Specifically, it is judged whether or not the total number of the measured data at the designated angle is smaller than the total number of the measured data at "the designated angle $-\Delta\theta$" and the difference thereof is equal to or greater than the threshold (S12). For example, a case where the total number of the measured data at the designated angle is smaller, by not less than 15, than the total number of the measured data is smaller than the number of the measured data at "the designated angle $-\Delta\theta$" is judged as the measurement error.[C16] In the meantime, as an example of the judgment criteria based on the ratio of the numbers of the measured data, a case where the ratio of the number of the measured data at the designated angle with respect to the number of the measured data at "the designated angle $-\Delta\theta$" is equal to or smaller than a certain value (for example, equal to or smaller than 70%) is judged as the measurement error. Note that, when a judgment is made based on the difference or the ratio of the numbers of the measured data, it is also possible that change in the edge thickness of the lens affects the judgment result. In particular, there are some cases where the edge thickness of the lens changes greatly with respect to the angle in the holding axis rotational direction $\theta$ in a high power lens. In such cases, the threshold may be determined according to the dioptric power of the lens (for example, the ratio of the number of the measured data should be 60% or less if the dioptric power of the lens is smaller than −3D, 70% or less if it is −3D or more and +3D or less, and 60% or less if it is +3D or more). In this example, in the case where the radial direction measured data by the laser displacement meter 14A is supplemented in step S11, the radial direction the measured data after the supplement is used as the radial direction measured data by the laser displacement meter 14A. However, the radial direction measured data before the supplement may also be used.

(1-a-4) The Fine Measurement Process (Steps S131 to S138)

In the case where the data processor 16 judges in step S12 that the difference between the both is equal to or greater than the threshold, the measurement controller 15 of the control computer 50 executes fine measurement (measurement of displacement in the radial direction at smaller angle pitches) in the subsequent steps S131 to S138 based on the fine measurement control program 57. Note that, in this example, fine measurement is made with use of the laser displacement meter 14B which is arranged in the orientation suitable for measurement in the vicinity of the steep angle, and the measured data by it is supplemented as the radial direction measured data by the laser displacement meter 14A. Specifically, first, the measurement controller 15, in accordance with the fine measurement program, drives the holding axis rotation motor 31 via the motor controller 54 so as to rotate the holding axis 11, and set the laser displacement meter 14B to create the angle "the designated angle $-\Delta\theta$" immediately before the designated angle at which it is judged in step S12 that measurement error has occurred (S131).

The measurement controller 15 drives the X-axis motor 23 via the motor controller 54 at the angle position, moves the lens 1 in the holding axis direction X via the holding axis 11, and causes the laser displacement meter 14B to measure displacement of the periphery of the lens 1 in the holding axis direction X at the angle position "the designated angle $-\Delta\theta$" (S132 to 134). The displacement measured data of the periphery of the lens 1 in the holding axis direction X at the angle position "the designated angle $-\Delta\theta$" measured by the laser displacement meter 14B is stored in the data storage section 53 (S135). Note that, the procedures from steps S132 to S135 are the same as the procedures in the above-described steps S3 to s6 except that measurement is made with use of the laser displacement meter 14B only. Accordingly, detailed explanation thereof will be omitted.

After the movement of the lens 1 by the set amount in the holding axis direction X is completed, the measurement controller 15 judges whether or not measurement has been made until "the designated angle $+\Delta\theta$" (S136). If measurement has not been made, the measurement controller 15 advances to step S137.

In step S137, the measurement controller 15 drives the holding axis rotation motor 31 via the motor controller 54 so as to rotate the holding axis 11 at the designated pitch angles $d\theta$ (for example, $d\theta=0.1$ degree), and causes the laser displacement meter 14B to make fine measurement of the displacement in the radial direction of the periphery of the lens 1 at each angle position (S137). Note that the fine measurement is executed within the range of the designated angle$\pm\Delta\theta$ (for example, $\Delta\theta=1$ degree). Subsequently, the measurement controller 15 sets the movement orientation in the holding axis direction X of the lens 1 held by the holding axis 11 to the direction opposite to the direction at the previous measurement (S138). Subsequently, the measurement controller 15 executes the procedures from steps S133 to S134, and causes the laser displacement meter 14B to measure the displacement in the radial direction of the periphery of the lens 1. The procedures in the steps S136, S137, S138, S133, S134 and S135 are repeatedly executed until it is judged in step S136 that measurement has been made until "the designated angle +Δθ".

The data processor 16 of the control computer 50 executes step S14, at the stage where fine measurement has been completed until "the designated angle +Δθ", or in the case where it judges in step S12 that the difference between the total number of the measured data at the designated angle and the total number of the measured data at "the designated angle −Δθ" is within the threshold. In other words, in step S14, the data processor 16 judges whether or not the data comparison in steps S10 to S12 has been executed at the designated angles for the range equivalent to 360 degrees. If the data comparison has not been executed, the data processor 16 causes the procedures in steps S10, S11, S12, S131, S132, S133, S134, S135, S136, S137 and S138 to be executed repeatedly, while setting an angle added by Δθ as a new designated angle.

When the data processor 16 executes the data comparison for the range equivalent to 360 degrees in step S14, it terminates the measurement operation (S18).

(1-a-5) The Shape Data Generation Process

Subsequently, the data processor 16 generates the peripheral shape data of the lens 1, in accordance with the shape data generation program, based on the radial direction measured data by the laser displacement meter 14A which is acquired in accordance with the above-described procedures. Specifically, the data processor 16 converts the distance VAn from the reference surface for the laser displacement meter 14A to the lens edge surface in the above-described radial direction measured data to the distance VBn from the axis line 45 of the holding axis 11. That is, when the distance from the reference surface 46 for the laser displacement meter 14A to the axis line 45 of the holding axis 11 is assumed to be LA, the peripheral shape data are (LA-VAn, Xn, θm) (n=1, 2, 3, ..., N) (m=1, 2, 3, ..., M). Note that, the data may be converted to a data made of polar coordinate from the boxed center based on the thus acquired peripheral shape data, or may be converted to a three-dimensional shape data in other data formats.

(1-a-6) The Lens Circumference Calculation Process

The circumference of the lens is computed based on the shape data acquired in the above-described shape data generation process.

(1-a-7) The Acceptance/Rejection Judgment Process

Acceptance/rejection of the lens peripheral shape is judged by comparing the shape data acquired in the above-described shape data generation process or the circumference acquired in the above-described lens circumference calculation process with the design data. Next, the lens judged as acceptable is transferred to the subsequent process, where the spectacle lens is manufactured. In the case where an order for the spectacle frame is also received, spectacles are manufactured by mounting the spectacle lens onto the spectacle frame. The thus manufactured spectacle lens or the spectacles are delivered to the orderer.

(1-b) When the Measurement Position is Moved in the Holding Axis Rotational Direction θ at Each Holding Axis Direction X Position (1-b-1) The Radial Direction Displacement Measurement Process (Steps S21 to S28)

As shown in FIG. 12, steps S21, S22 are executed in the same manner as the above-described steps S1, S2, respectively. Next, the measurement controller 15 of the control computer 50 drives the holding axis rotation motor 31 via the motor controller 54, and rotates the lens 1 via the holding axis 11 by a designated angle (for example, 360 degrees) in the holding axis rotational direction θ (S23).

While the holding axis 11 is rotated in the holding axis rotational direction θ in the above-described step S23, every time the measurement controller 15 detects that the holding axis 11 has been rotated at a designated angle pitch (for example, 1 degree in the holding axis rotational direction θ) which has been set in advance based on the actuating signal (pulse signal) of the holding axis rotation motor 31 it has acquired from the motor controller 54, the measurement controller 15 outputs the measurement command signal to the displacement meter controller 62. Every time the displacement meter controller 62 receives the above-described measurement command signal, it acquires the measured values from the laser displacement meters 14A and 14B, and outputs the thus acquired measured values to the measured value A/D conversion board 55 of the control computer 50. The measured value A/D conversion board 55 which has received the measured values converts the measured values into digital quantity (S24). The measurement controller 15 associates the measured values converted into digital data with the angle in the holding axis rotational direction θ and the position in the holding axis direction X when the measured values are measured, and stores them in the data storage section 53 as the radial direction measured data (S25).

Next, the measurement controller 15 judges whether or not the lens 1 has been moved by the holding axis 11 by the set amount (for example, 10 mm) or more in the holding axis direction X (S26). If the lens 1 has not been moved, the measurement controller 15 advances to step S27. In step S27, the measurement controller 15 drives the X-axis motor 23 via the motor controller 54 so as to move the lens 1 via the holding axis 11 by the specified amount (for example, 0.1 mm) in the holding axis direction X, and causes the procedures from step S23 to step S25 to be executed. The procedures in steps S26, S27, S23, S24 and S25 are repeatedly executed until it is judged in step S26 that the lens 1 has been moved by the set amount or more in the holding axis direction X.

When the measurement controller 15 judges in step S26 that the lens 1 has been moved by the set amount, it judges whether or not the measured data by the laser displacement meters 14A and 14B exist across the entire circumference of the periphery of the lens 1 (S28). If the measured data by the laser displacement meters 14A and 14B do not do not exist across the entire circumference, the measurement controller 15 advances to step S27. If they exist, the measurement controller advances 15 to step S29.

(1-b-2) The Measured Data Complement Process (Steps S29 to S30)

(1-b-3) The Measurement Error Judgment Process (Step S31)

(1-b-4) The Fine Measurement Process (Steps S321 to S328)

Since the subsequent procedures in steps S29, S30, S31, S321, S322, S323, S324, S325, S326, S327, S328, S33 and S34 hereinafter are similar to the above-described procedures in steps S10, S11, S12, S131, S132, S133, S134, S135, S136, S137, S138, S14 and S15. Accordingly, the explanation thereof will be omitted. In addition, since the shape data generation process, the lens circumference calculation process, and the acceptance/rejection judgment process are the same as the processes as described above, the explanation thereof will be omitted.

Note that it is judged whether or not the lens edge surface exists in the holding axis direction X in the above-described step S28. Therefore, the above-described step S26 may be omitted so as to eliminate unnecessary movement, whereby the measurement time may be shortened.

Because of the structure as described above, the following operational effects (1) to (10) can be obtained according to the above-described embodiment.

(1) The peripheral shape of the lens 1 is measured in a non-contact manner with use of the laser displacement meters 14A and 14B. Therefore, the peripheral shape of the lens can be measured easily and accurately, even in the case where the lens peripheral shape is complicated such as a case where the bevel 3 or the groove 4 is provided in the lens peripheral shape.

(2) The light projecting section 34 and the light receiving section 35 of the laser displacement meter 14A are installed such that they are aligned in the direction perpendicular to the holding axis 11 which holds the lens 1. Therefore, the peripheral shape of the lens can be accurately measured because the reflected light can be received preferably even in the case where, for example, the groove 4 in the peripheral shape of the lens is deep, or the bevel 3 has a steep slope.

(3) The laser displacement meters 14A and 14B are set such that laser beams irradiated from the laser displacement meters 14A and 14B are in a direction perpendicular to the axis line of the holding axis. Therefore, the distance from the axis line of the holding axis to the measurement position at the lens periphery can be easily calculated, and the measurement positions for the laser displacement meters 14A and 14B can be set easily. Accordingly, measurement can be made easier.

(4) The peripheral shape of the lens 1 can be measured more accurately by executing re-measurement by reducing the measurement interval (measurement pitch) even in the case where a measurement result cannot be acquired properly for the peripheral shape of the lens 1 by the laser displacement meter 14A.

(5) The laser displacement meters 14A and 14B are installed such that the conditions of the equation (1) and the equation (2) are satisfied. Therefore, the entire peripheral shape of the lens 1 is within the measurement range width R of the laser displacement meters 14A and 14B. Accordingly, the entire peripheral shape of the lens 1 can be accurately measured by the laser displacement meters 14A and 14B. In addition, the laser displacement meters can be easily selected and installed.

(6) The movement direction of a laser beam is made opposite at every rotational position around the holding axis 11, in the case where laser beams from the laser displacement meters 14A and 14B are scanned in the holding axis direction X with respect to the lens 1. Therefore, measurement can be speeded up.

(7) Measurement is completed at the stage where it is judged that the peripheral shape of the lens 1 cannot be measured for the entire circumference, in the case where laser beams from the laser displacement meters 14A and 14B are scanned in the holding axis rotational direction θ with respect to the lens. Therefore, measurement can be speeded up.

(8) At the sharp angle position 44 where the peripheral shape of the lens 1 changes at a steep angle, fine measurement is executed at smaller measurement pitches before and after the sharp angle position 44 in the holding axis rotational direction θ. As a result, the number of the measurement positions at which measurement is possible can be increased in the vicinity of the sharp angle position 44. Therefore, the peripheral shape at the sharp angle position 44 can be accurately determined through approximate calculation based on the measured data at the increased number of the measurement positions.

(9) The laser displacement meters 14A and 14B, in which the light projecting section 34 and the light receiving section 35 are arranged at different positions, have different peripheral shapes which can be measured preferably for the lens 1 to be measured. Therefore, the peripheral shape of the lens 1 can be accurately measured by making use of the difference in characteristics of these laser displacement meters 14A, 14B, for example, by measuring the peripheral shape of the lens 1 by complementing the measured data, through employment of the measured data by the laser displacement meter 14B, in the case where there is no the measured data by the laser displacement meter 14A.

(10) The peripheral shape of the spectacle lens 1 is measured with use of the lens shape measuring apparatus 10. Therefore, a spectacle lens with accurately measured peripheral shape of the spectacle lens 1 can be manufactured.

Next, the spectacle lens 1 which has a peripheral shape which has been accurately measured and judged as acceptable based on the acceptance/rejection judgment based on the measurement result is mounted onto the spectacle frame. As a result of this, spectacles in which the spectacle frame and the spectacle lens are properly fitted with each other can be realized.

[B] The Second Embodiment

FIG. 13 is a flowchart showing the procedures for measuring the peripheral shape of the lens by scanning a laser beam in the holding axis direction X according to the second embodiment of the lens shape measuring apparatus of the present invention.

FIG. 14 is a flowchart showing the procedures for measuring the peripheral shape of the lens by scanning a laser beam in the holding axis rotational direction θ according to the second embodiment of the lens shape measuring apparatus. The second embodiment differs from the first embodiment in that the lens shape measuring apparatus in the second embodiment uses the laser displacement meter 14A only and omits the use of the laser displacement meters 14B.

(2-a) When the Measurement Position is Moved in the Holding Axis Direction X at Each Holding Axis Rotation Angle (2-a-1) The Radial Direction Displacement Measurement Process (Steps 41[Y17] to S47)

As shown in FIG. 13, steps S41, S42 are executed in the similar manner as steps S1, S2 shown in FIG. 11, respectively. Next, the measurement controller 15 of the control computer 50 sets the movement orientation of the lens 1 held by the holding axis 11 in the holding axis direction X to a positive value in the same manner as step S3 in FIG. 11 (S43), drives the X-axis motor 23 via the motor controller 54 so as to move the holding axis 11 in the positive direction of the holding axis direction X, and thereby to move the lens 1 by the set amount (for example, 10 mm) in the same direction and in the same orientation as the holding axis 11 (S44).

While the holding axis 11 is moved by the set amount in the positive direction of the holding axis direction X in the above-described step S44, every time the measurement controller 15 detects that the holding axis 11 has moved by the designated interval which has been set in advance (for example, 0.1 mm in the holding axis direction X) based on an actuating signal (pulse signal) of the X-axis motor 23 it has acquired from the motor controller 54, the measurement controller 15 outputs the measurement command signal to the displacement meter controller 62. Every time the displacement meter controller 62 receives the above-described measurement command signal, it acquires the measured value from the laser displacement meter 14A, the displacement meter controller 62 outputs the thus acquired measured values to the measured value A/D conversion board 55 of the control computer 50. The measured value A/D conversion board 55 which has received the measured values converts the measured values into digital quantity (S45). The measurement controller 15 associates the measured values converted into digital quantity with the angle in the holding axis rotational direction θ and the position in the holding axis direction X when the measured values are measured, and stores them in the data storage section 53 as the radial direction measured data (S46).

Next, when the movement of the lens 1 in the holding axis direction X by the set amount is completed, the measurement controller 15 judges whether or not the radial direction measured data has been measured in the holding axis rotational direction θ for 360° (S47). If measurement has not been made, the measurement controller 15 advances to step S48. In step S48, the measurement controller 15 drives the holding axis rotation motor 31 via the motor controller 54 so as to rotate the holding axis 11 in the holding axis rotational direction θ by the predetermined pitch angle Δθ (for example, Δθ=1 degree). Subsequently, the measurement controller 15 sets the movement orientation in the holding axis direction X of the lens 1 held by the holding axis 11 to the direction opposite to the direction at the previous measurement (S49). Subsequently, the measurement controller 15 causes the procedures in steps S44 to S46 to be executed, and causes the laser displacement meter 14A to measure the displacement in the radial direction of the periphery of the lens 1. The procedures in steps S47, S48, S49, S44, S45 and S46 are repeatedly executed until it is judged that measurement has been made in the holding axis rotational direction θ for 360° in step S47. The thus acquired radial direction measured data are the values (VAn, Xn, θm) (n=1, 2, 3, . . . , N) (m=1, 2, 3, . . . , M). Herein, θm denotes the angle in the holding axis rotational direction θ, M denotes the number of measurements during 1 revolution in the holding axis rotational direction, VAn denotes the measured value by the laser displacement meter 14A (the distance from the reference surface 46 for the laser displacement meter 14A to the lens edge surface), Xn denotes the position in the holding axis direction X, and N denotes the number of measurements within the set amount.

In the above-described step S47, when the measurement controller 15 judges that the displacement in the radial direction of the periphery of the lens 1 has been measured for the range equivalent to 360 degrees, the data processor 16 of the control computer 50 compares the radial direction measured data by the laser displacement meter 14A at an arbitrarily designated angle in the holding axis rotational direction θ with the radial direction measured data by the laser displacement meter 14A which was measured at "the designated angle −Δθ" just prior to the measurement at the designated angle (S50), among the radial direction measured data of the periphery of the lens 1 stored in the data storage section 53 in a manner that they are arranged for each angle in the holding axis rotational direction θ and each position in the holding axis direction X of the periphery of the lens 1.

(2-a-2) The Measurement Error Judgment Process (Steps S50 to S51)

Next, the data processor 16 judges, in accordance with the measurement error judgment program 64, whether or not measurement error has occurred in the radial direction measured data by the laser displacement meter 14A at the designated angle.

Since S51, which is the measurement error judgment processing, is similar to step S12 in FIG. 11, the explanation thereof will be omitted.

(2-a-3) The Fine Measurement Process (Steps S521 to S526)

In step S51, in the case where it is judged by the data processor 16 that the difference between the both is equal to or greater than the threshold, the measurement controller 15 of the control computer 50 executes fine measurement in the following steps S521 to S528 based on the fine measurement control program 57.

The fine measurement process is similar to S131 to S138 in FIG. 11, except that the laser displacement meter 14B replaces the laser displacement meter 14A. Therefore, the explanation thereof will be omitted.

The data processor 16 of the control computer 50 executes step S53, at the stage where fine measurement has been completed until "the designated angle +Δθ", or in the case where it judges in step S51 that the difference between the total number of the measured data at the designated angle and the total number of the measured data at "the designated angle −Δθ" is within the threshold. That is, in step S53, the data processor 16 judges whether or not the data comparison in steps S50 to S51 has been executed for the designated angle for the range equivalent to 360 degrees. If it has not been executed, an angle added by Δθ is set as a new designated angle, and the procedures in steps S50, S51, S12, S521, S522, S523, S524, S525, S526, S527 and S528 are executed repeatedly.

The data processor 16 terminates the measurement operation when the data comparison has been executed for the range equivalent to 360 degrees in step S56 (S54).

Note that the shape data generation process, the lens circumference calculation process, and the acceptance/rejection judgment process, which are the subsequent processes, are the same as the processes as described above. Therefore, the explanation thereof will be omitted.

(b) When the measurement position is moved in the holding axis rotational direction θ at each position in the holding axis direction X As shown in FIG. 14, steps S61, S62 are executed in a similar manner as the above-described steps S41, S42, respectively. Next, the measurement controller 15 of the control computer 50 drives the holding axis rotation motor 31 via the motor controller 54 so as to rotate the lens 1 via the holding axis 11 by the designated angle (for example, 360 degrees) in the holding axis rotational direction θ (S63).

While the holding axis 11 is rotated in the holding axis rotational direction θ in the above-described step S63, every time the measurement controller 15 detects that the holding axis 11 has been rotated at the designated angle interval (for example, 1 degree in the holding axis rotational direction θ) which has been set in advance, the measurement controller 15 outputs the measurement command signal to the displacement meter controller 62 based on an actuating signal (pulse signal) of the holding axis rotation motor 31 it has acquired from the motor controller 54. Every time the displacement meter controller 62 receives the above-described measurement command signal, it acquires the measured value from the laser displacement meter 14A, and outputs the thus acquired measured value to the measured value A/D conversion board 55 of the control computer 50. The measured value A/D conversion board 55 which has received the measured value converts the measured value into a digital quantity (S64). The measurement controller 15 associates the measured value converted into a digital quantity with the angle in the holding axis rotational direction θ and the position in the holding axis direction X when the measured value is measured, and stores them in the data storage section 53 as the radial direction measured data (S65).

Next, the measurement controller 15 judges whether or not the lens 1 has been moved by the holding axis 11 by the set amount (for example, 10 mm) or more in the holding axis direction X (S66). If the lens 1 has not been moved, the measurement controller 15 advances to step S67. In step S67, the measurement controller 15 drives the X-axis motor 23 via the motor controller 54 so as to move the lens 1 via the holding axis 11 by the designated amount (for example, 0.1 mm) in the holding axis direction X, and then causes the procedures in steps S63 to S65 to be executed. The procedures S66, S67, S63, S64 and S65 are repeatedly executed until it is judged in step S66 that the lens 1 has been moved by the set amount or more in the holding axis direction X.

Further, when the measurement controller 15 judges in step S66 that the lens 1 has been moved by the set amount, it judges whether or not the measured data by the laser displacement meter 14A exists across the entire circumference of the periphery of the lens 1 for 2 successive times (S68). If the measured data by the laser displacement meter 14A across the entire circumference does not exist in 2 successive times, the measurement controller 15 advances to step S67. If it exists, the measurement controller 15 advances to step S69.

(2-b-2) The Measurement Error Judgment Process (Steps S69 to S70)

(2-b-3) The Fine Measurement Process (Steps S711 to S718)

The subsequent procedures in steps S69, S70, S711, S712, S713, S714, S715, S716, S717, S718, S72 and S73 are similar to the above-described procedures in step S50, S51, S521, S522, S523, S524, S525, S526, S527, S528, S53 and S54. Therefore, the explanation thereof will be omitted. In addition, the shape data generation process, the lens circumference calculation process, and the acceptance/rejection judgment process are the same as the processes as described above. Therefore, the explanation thereof will be omitted.

Because of the structure as described above, according to the above-described second embodiment, similar operational effects are given, with use of the laser displacement meter 14A, as the operational effects (1) to (8) and (10) of the first embodiment.[C18]

[c] The Third Embodiment

FIG. 15 is an enlarged view showing the laser displacement meter used in the measuring apparatus body and the state in which the laser displacement meter measures the edge surface shape of the lens according to the third embodiment of the lens shape measuring apparatus of the present invention. FIG. 16 is a flowchart showing the procedures for measuring the peripheral shape of the lens with use of the lens shape measuring apparatus according to the third embodiment. The third embodiment differs from the first and second embodiments in that a laser displacement meter 114 according to the third embodiment irradiates a line-shaped laser beam, while the first and second embodiments irradiate a spot-like laser beam.

The laser displacement meter 114 according to the third embodiment is a laser displacement meter with a light-receiving system of a diffuse reflection type, irradiating a line-shaped laser beam and employing a two-dimensional triangulation method as the measurement principle. As shown in FIG. 3, the laser displacement meter includes the light projecting section 134 and the light receiving section 135. The light projecting section 134 includes a semiconductor laser 136 as the light-emitting element, a light transmitting lens 137a which focuses a laser beam from the semiconductor laser 136, and a cylindrical lens 137b which spreads light from the light transmitting lens in the horizontal direction. The light which has been made into line-shaped light by the cylindrical lens is irradiated via a light projecting window 138 to the lens 1 which is the measurement object.

The above-described light receiving section 135 includes a two-dimensional optical position detection element 141 and a light-receiving lens 142. It focuses reflected light which has been diffused and reflected by the lens 1 on the optical position detection element in a line-shaped form via a light-receiving window 143 and the light-receiving lens 142. The laser displacement meter 114 is installed such that the light projecting section 134 and the light receiving section 135 are aligned in the direction perpendicular to the axis line 45 of the holding axis 11. In addition, the laser displacement meter 114 has been installed at a predetermined distance from the axis line 45 in advance, such that a line-shaped laser beam irradiated from the light projecting section 134 is contained in a plane which contains the axis line 45. In the measurement range Ra of the laser displacement meter 114, Rh denotes the measurement range width in the longitudinal direction, Rwf denotes the measurement range width in the width direction on a further side, and Rwn denotes the measurement range width in the width direction on a closer side. In addition, the distance from the reference surface 146 of the laser displacement meter to the center of the measurement range width Rwf or Rwn in the width direction and to the central position of the measurement range width Rh in the longitudinal direction is assumed as the reference distance F. The position of the laser displacement meter should be preferably set such that, the following equation:

$$Rh \geq (A-B)/2 \quad (3)$$

is satisfied, and the distance L from the axis line 45 to the reference surface 146 satisfies:

$$F+(A-Rh)/2 \leq L \leq F+(B+Rh)/2 \quad (4).$$

Note that, in the above-described equations, A denotes the maximum width in the radial direction of the lens 1, and B denotes the minimum width in the radial direction of the lens 1. In addition, the laser displacement meter is arranged at a position in the X axis direction where the edge surface 2 of the lens 1 be within the measurement range Ra.

In the case where such laser displacement meter 114 is used, the amount of displacement of the edge surface 2 of the lens 1 in the thickness direction can be measured by a single irradiation of a laser beam. Therefore, in this case, the lens need not be moved in the X axis direction unlike the first and second embodiments.

Note that, this example shows a case where a line-shaped laser beam spreads as the beam advances toward the rear. Alternatively, a laser displacement meter may be used from which both ends of a laser beam irradiated are in parallel.

Next, the measurement procedure according to the third embodiment will be explained with reference to FIG. 16.

(3-1) The Measurement of Displacement in the Radial Direction Step (Steps S81 to S85)

As shown in FIG. 16, steps S81, S82 are executed in a similar manner as steps S61, S62, respectively, in FIG. 14. Next, the measurement controller 15 of the control computer 50 drives the holding axis rotation motor 31 via the motor controller 54, so as to rotate the lens 1 via the holding axis 11 by the designated angle (for example, 360 degrees) in the holding axis rotational direction θ (S83).

While the holding axis 11 is rotated in the holding axis rotational direction θ in the above-described step S83, every time the measurement controller 15 detects that the holding axis 11 has been rotated by the designated angle interval (for example, 1 degree in the holding axis rotational direction θ) which has been set in advance based on an actuating signal (pulse signal) of the holding axis rotation motor 31 it has acquired from the motor controller 54, the measurement controller 15 outputs the measurement command signal to the displacement meter controller 62. Every time the displacement meter controller 62 receives the above-described measurement command signal, it acquires the measured value from the laser displacement meter 114, takes out the measured data at an interval of the designated amount (for example, 0.1 mm) in the holding axis direction X from the thus acquired measured values, and outputs them to the measured value A/D conversion board 55 of the control computer 50. The measured value A/D conversion board 55 which has received the measured values converts the measured value into the digital quantity (S84). The measurement controller 15 associates the measured value converted into a digital quantity with the angle in the holding axis rotational direction θ and the position in the holding axis direction X when the measured value is measured, and stores them in the data storage section 53 as the radial direction measured data (S85). When the measured data by the laser displacement meter 114 is acquired across the entire circumference (equivalent to 360 degrees), the measurement controller 15 advances to step S86.

(3-2) The Measurement Error Judgment Process (Steps S86 to S87)

The subsequent procedures in steps S86 and S87 are the same as the procedures in the above-described steps S69, S70. Accordingly, the explanation thereof will be omitted.

(3-3) The Fine Measurement Process (Steps S881 to S884)

When the data processor detects measurement error according to a measurement error program 694 in step 87, the measurement controller 15 of the control computer 50 executes fine measurement in the following steps S881 to S884 based on the fine measurement control program 57. First, the measurement controller 15 drives the holding axis rotation motor 31 via the motor controller 54 so as to rotate the holding axis 11, and sets an angle of the laser displacement meter 114 to an angle "the designated angle $-\Delta\theta$" immediately before the designated angle at which measurement error is judged in step S87 (SS81). Next, the measurement controller 15 of the control computer 50 drives the holding axis rotation motor 31 via the motor controller 54 so as to rotate the lens 1 by "the designated angle $+\Delta\theta$" in the holding axis rotational direction dθ via the holding axis 11 (S882) Next, in step S883, the measurement controller 15 measures the radial direction measured data at each designated pitch angle θ (for example, dθ=0.1 degree) Note that the measurement operation is similar to that in S84 except that the measurement angle interval is different. Accordingly, the explanation thereof will be omitted. The thus measured radial direction measured data is stored in the data storage section, and the measurement controller advances to step S89. Since the procedure in step S89 is the same as that in step S72, the explanation thereof will be omitted. If it is judged in step S89 that measurement has been made for the range equivalent to 360 degrees, the measurement controller 15 terminates the measurement operation (S90). The subsequent shape data generation process, the lens circumference calculation process, and the acceptance/rejection judgment process are the same as those described above. Accordingly, the explanation thereof will be omitted.

In the case of the third embodiment, since the holding axis need not be moved in the X axis direction. Therefore, the third embodiment has an operational effect that the measurement time can be shortened. In addition, the light projecting section and the light receiving section of the laser displacement meter 114 are arranged perpendicular to the axis line 45. Therefore, similar operational effects can also be obtained as the other embodiments as described above.

Hereinabove, the present invention has been described based on the above-described embodiments. However, the present invention is not limited to these. For example, the above-described laser displacement meter 14A is of a type which irradiates a laser beam in a spot-like form. However, a type which irradiating a laser beam in a line-shaped form for performing two-dimensional measurement may be used. Such laser displacement meters include a type which measures a two-dimensional shape by scanning a laser beam in a certain direction and thereby forming a line-shaped laser beam, a type which measures a two-dimensional shape by irradiating a laser beam with a wide linear shape and thereby receiving it with a two-dimensional CCD, or the like. In the case where such laser displacement meters are used, the holding axis need not be moved in the axial direction during the measurement, as long as the lens periphery portion is arranged within a range of the width of a line-shaped laser beam. Therefore, what is necessary is to only change the rotational position of the holding axis thereby to change the lens holding position. Accordingly, measurement can be more simplified, and speeded up.

In the case where such a two-dimensional laser displacement meter is used, it is preferable the width direction of the line-shaped laser beam be in parallel to the holding axis. In addition, it is preferable that the width of a wave[C19] laser beam with respect to the lens holding axis be, for example, 2 cm or more, since such width can cover the edge surface of the spectacle lens. In addition, it is preferable that the light projecting section for projecting a laser beam and the light receiving section for receiving a laser beam be installed so as to be aligned in a direction perpendicular to the axis line of the holding axis. In addition, it is preferable that the laser displacement meters be installed such that the measurement range width R of the laser displacement meter with a line-shaped beam[Y20] satisfy the following equation (1), and the distance L from the axis line of the holding axis to the reference surface of the laser displacement meter satisfy the following equation (2).

$$R \geq (A-B)/2 \quad (1)$$

$$F+(A-R)/2 \leq L \leq F+(B+R)/2 \quad (2)$$

wherein, F denotes the reference distance for the laser displacement meter (the distance from the reference surface to the center of the measurement range), A denotes the maximum width in the radial direction of the lens, and B denotes the minimum width in the radial direction of the lens.

Further, it is preferable that the laser displacement meter be arranged such that a laser beam is perpendicular to the axis line of the holding axis.

Further, in the case where a second laser displacement meter is provided, and where it is judged that a measured value acquired by the above-described laser displacement meter is not a proper value, a measured value acquired by the second laser displacement meter at the same measurement position may complement the measured value by the laser displacement meter.

Further, in the case where it is judged that a measured value by the laser displacement meter with a line-shaped beam is not a proper value, measurement can be executed in the vicinity of the measurement position at smaller measurement intervals in the holding axis rotational direction.

Similar operational effects as those (1) to (10) of the first embodiment can be obtained, also in the case where a two-dimensional laser displacement meter as described above is used.

In the above-described embodiments, explanation was given on the case where, when a laser beam is scanned in the holding axis direction X of the lens 1, the scanning distance of a laser beam is set by moving the lens 1 by the uniform set amount (for example, 10 mm) in the holding axis direction X was explained uniformly. Instead, the scanning distance of a laser beam can be determined and set for each lens 1, based on the curve and the thickness of the lens 1 determined from the lens information. Alternatively, the scanning distance of a laser beam when the peripheral shape of the lens 1 is measured may be determined, by identifying the rearmost position of the edge surface of the lens 1 before starting measurement of the peripheral shape of the lens 1, measuring the thickness of the lens 1 at this position with a laser beam or the like, and determining it based on the result measurement.

Further, it is preferable that a measurement result of the lens peripheral shape measured by the lens shape measuring apparatus 10 in the above-described embodiments be stored in the peripheral shape data storage section 74 connected to the plant server, in a manner that the data is associated with an identification code for identifying the description of the received order. By doing this, the peripheral shape of the delivered lens can be understood.

BRIEF DESCRIPTION OF DRAWINGS

FIG. 4A is a sectional view of the peripheral shape having a bevel, and FIG. 4B is a sectional view of the peripheral shape having a groove.

Figure 1:
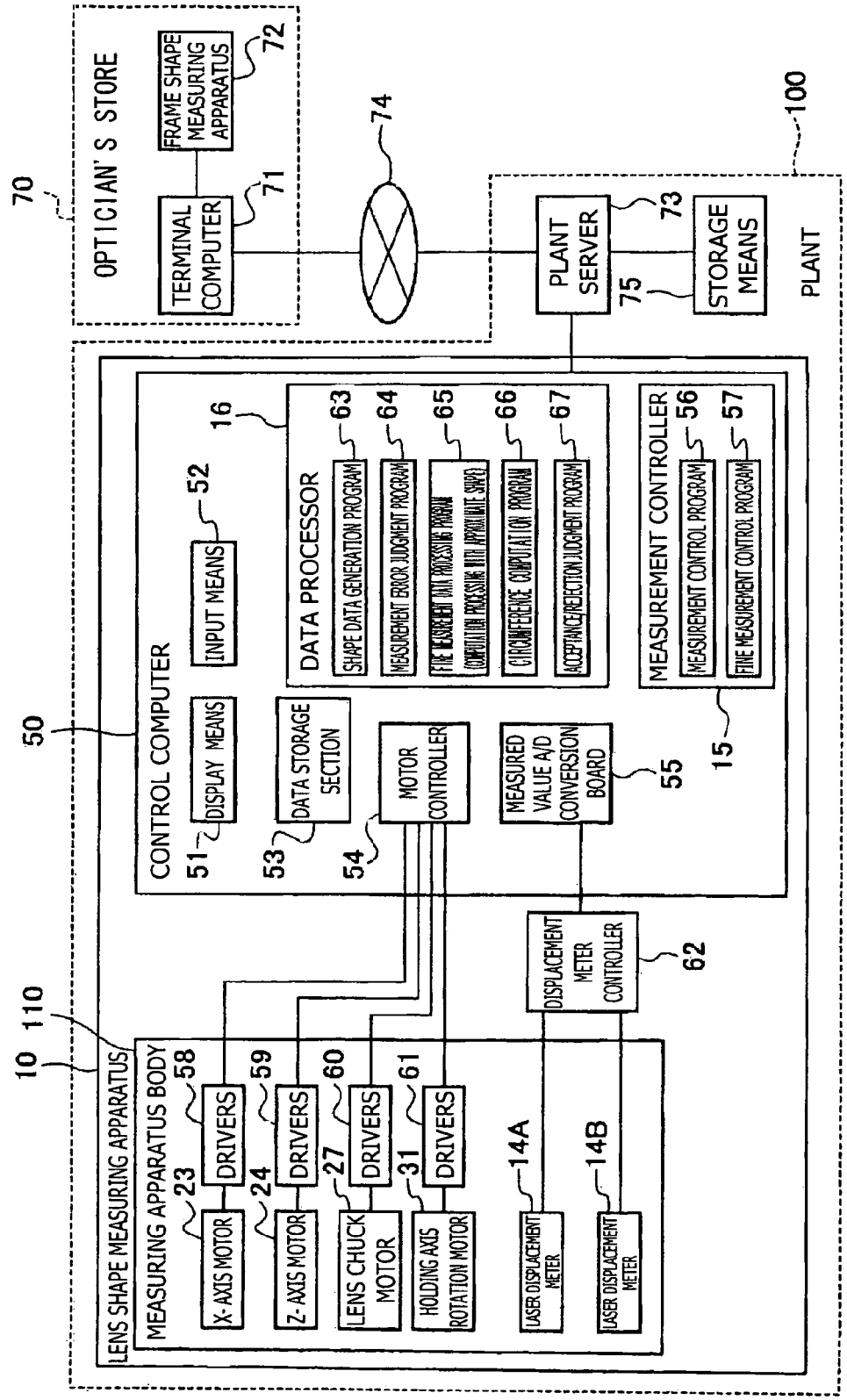
FIG. 1 is a block diagram according to a first embodiment of a lens shape measuring apparatus of the present invention.
Figure 2:
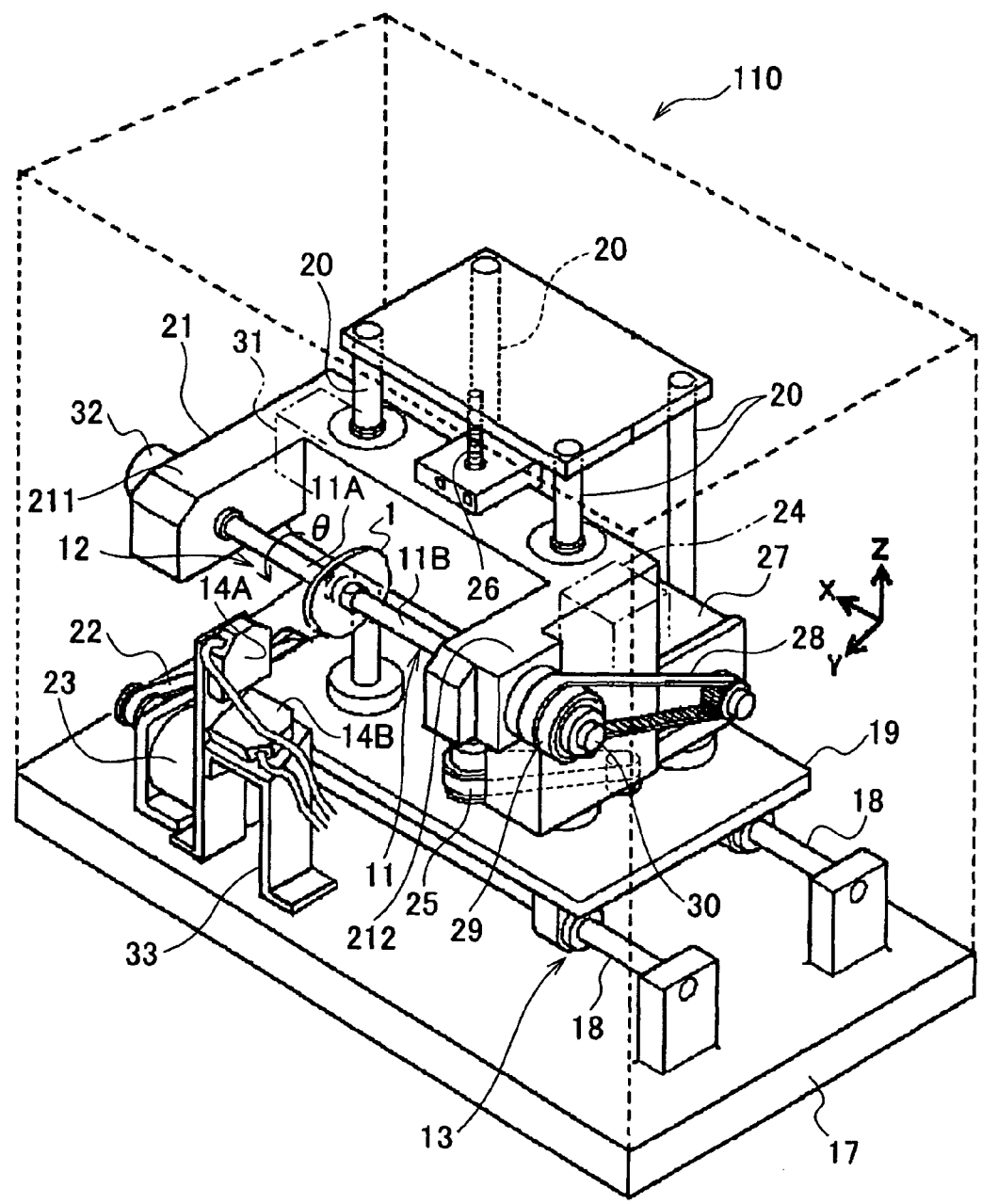
FIG. 2 is a perspective view showing a configuration of a measuring apparatus body of the lens shape measuring apparatus in FIG. 1.
Figure 3:
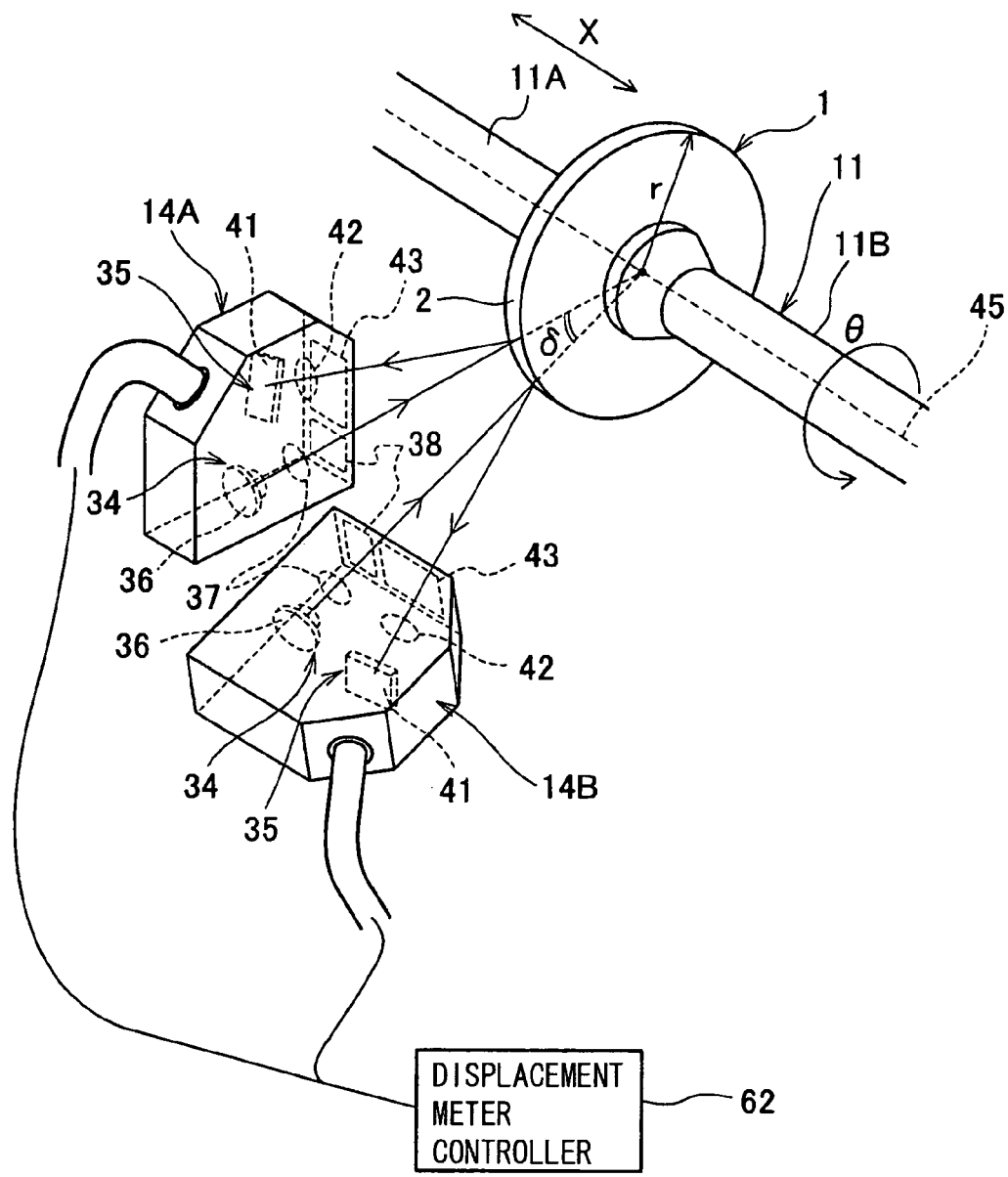
FIG. 3 is a magnified perspective view showing a part of FIG. 1.
Figure 4:
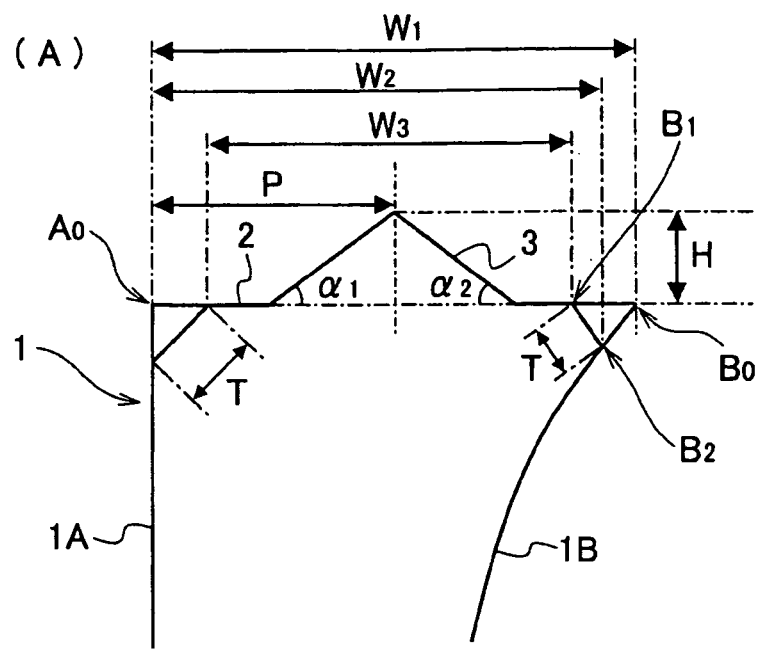
FIGS. 4A and 4B show a peripheral shape of the spectacle lens.
Figure 4:
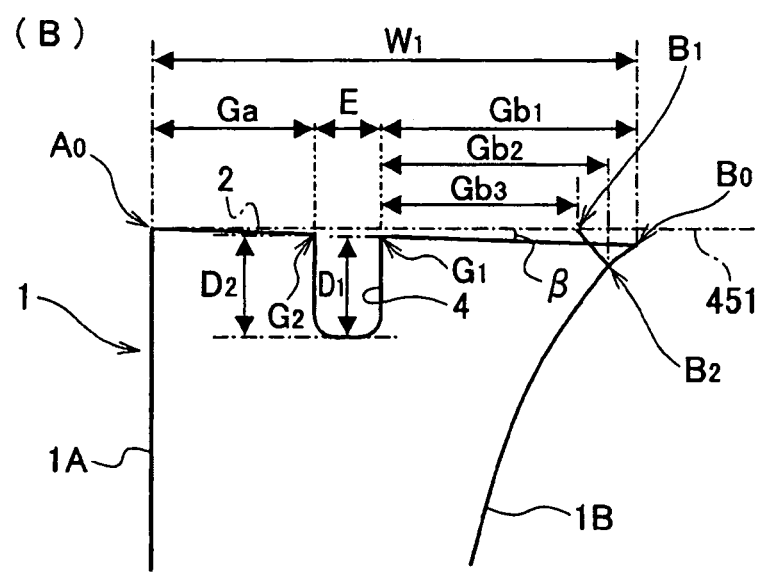
Figure 5:
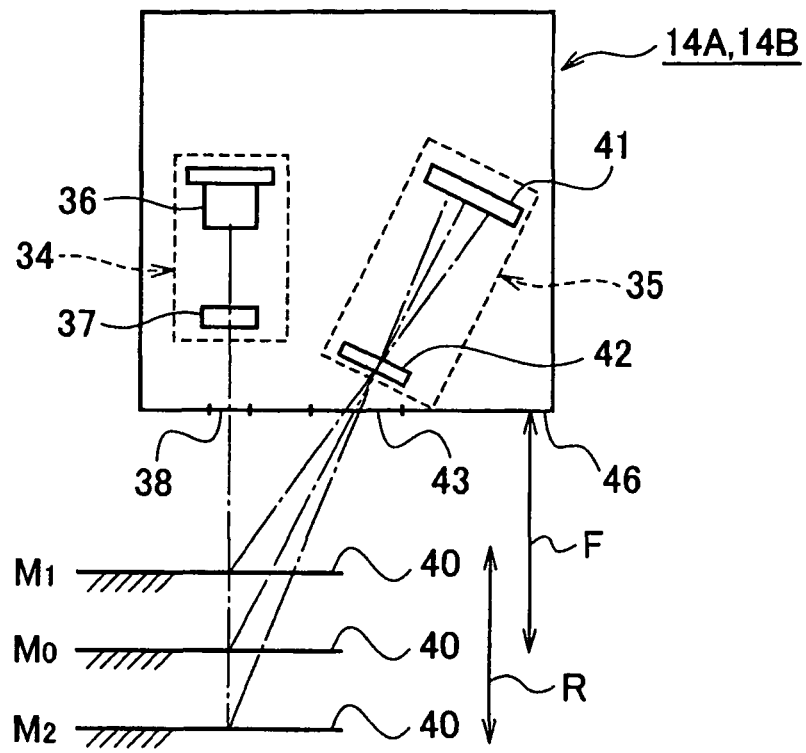
FIG. 5 is a diagram for explaining a measurement principle of the laser displacement meter in FIGS. 1 and 2.
Figure 6:
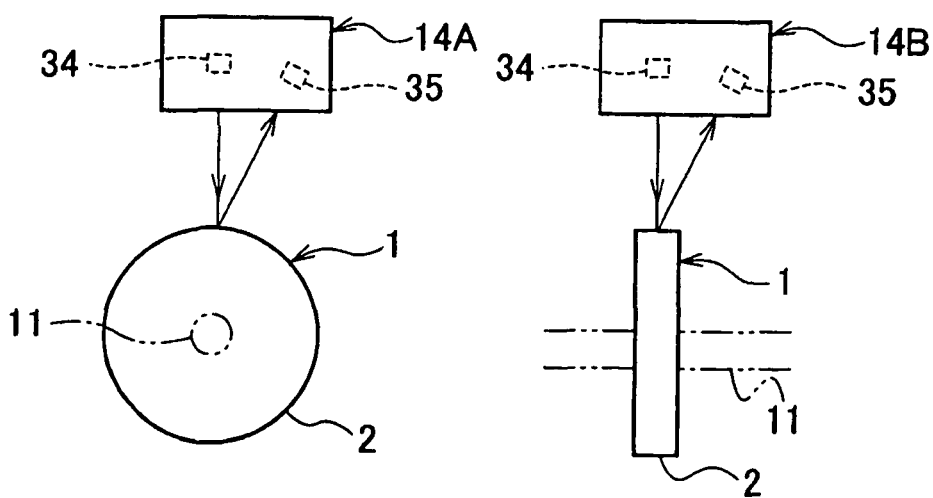
FIG. 6 is a diagram for explaining the arrangement relationship of the laser displacement meter with respect to the holding axis in FIGS. 1 and 2.
Figure 7:
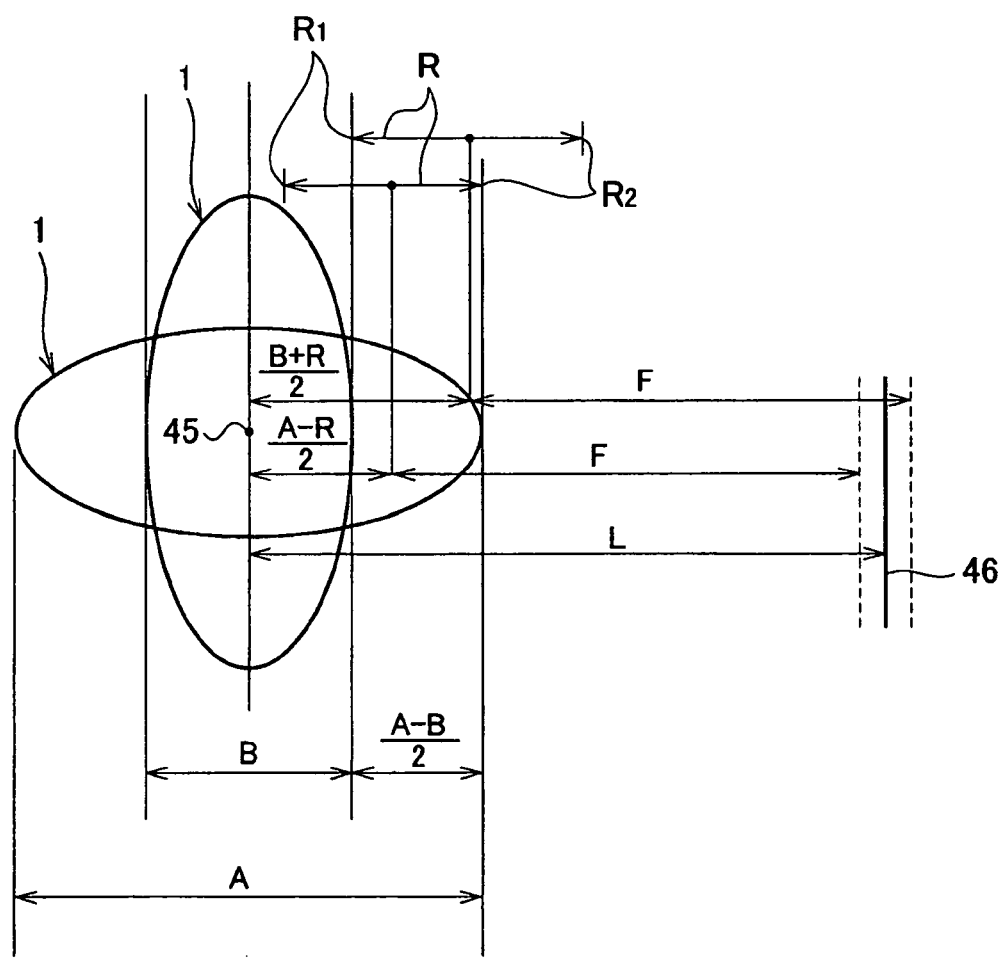
FIG. 7 is a diagram for explaining an installation distance of the laser displacement meter from the holding axis in FIGS. 1 and 2.
Figure 8:
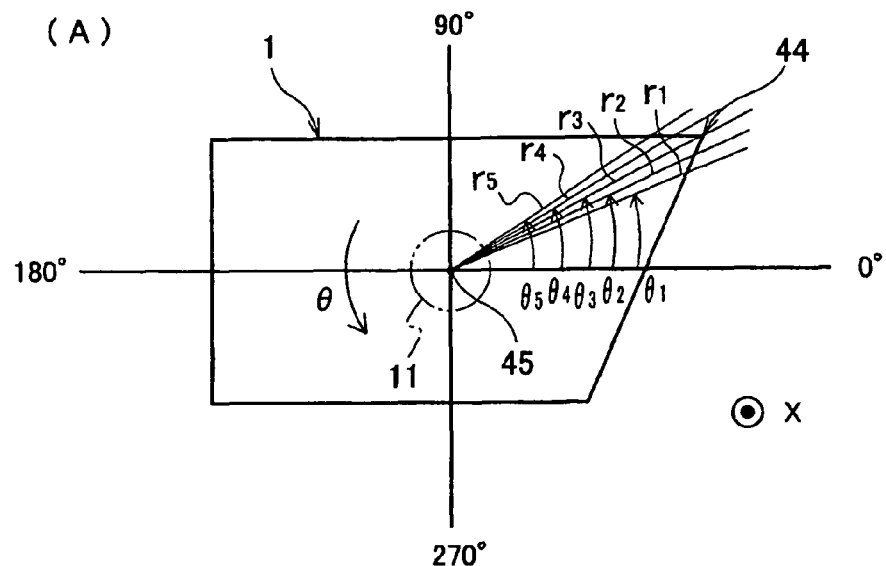
FIG. 8A is a front view for explaining a sharp angle position in the peripheral shape of the spectacle lens.
FIG. 8B is a diagram for explaining approximate calculation of the shape at the sharp angle position in FIG. 8A.
Figure 8:
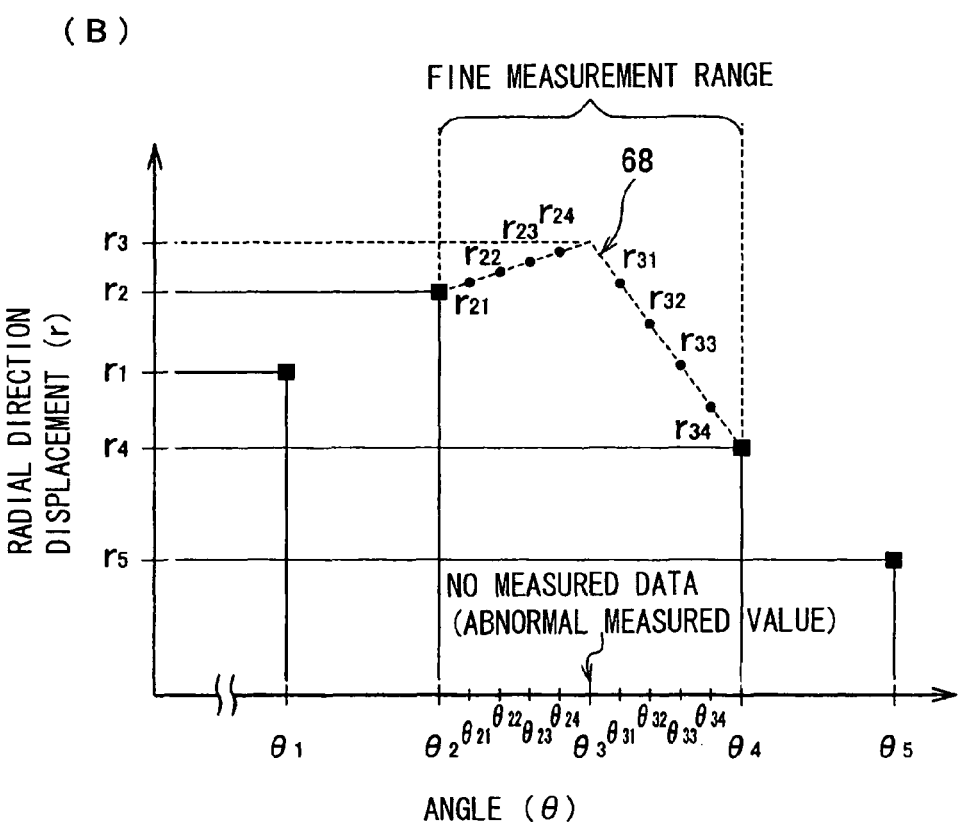
Figure 9:
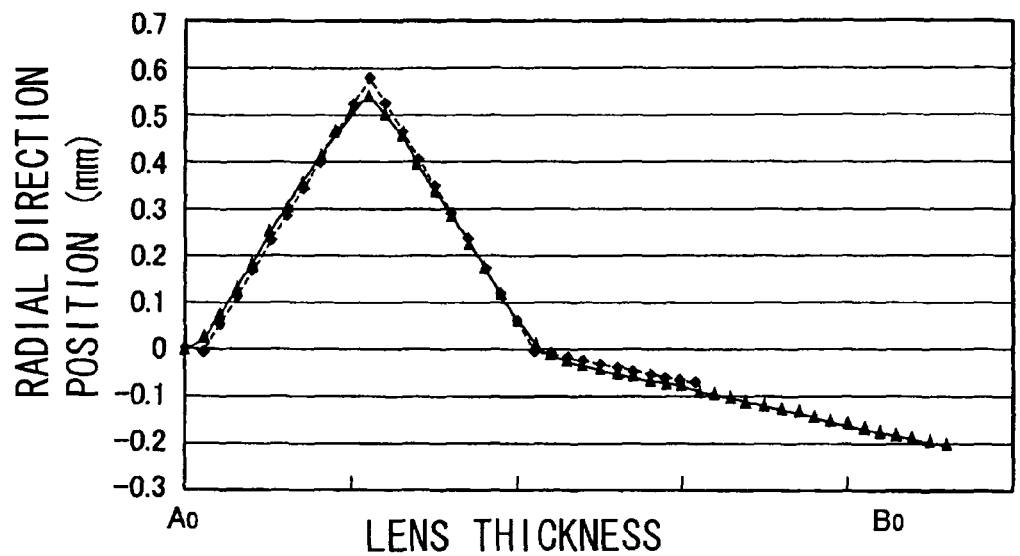
FIG. 9 is a graph plotting the lens peripheral shape data having a bevel generated in the lens shape measuring apparatus in FIG. 1.
Figure 10:
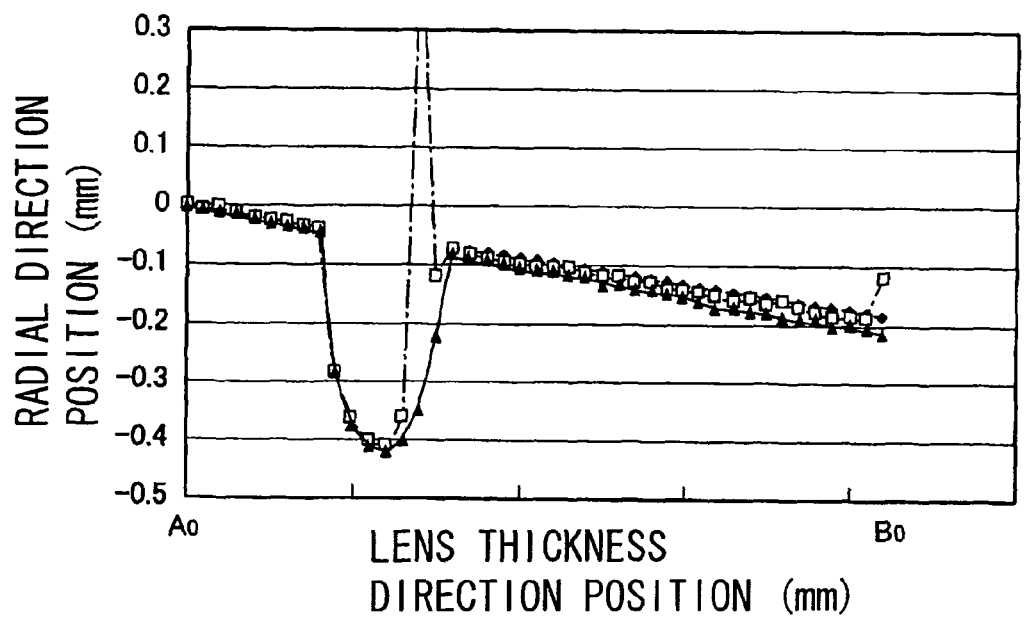
FIG. 10 is a graph plotting the lens peripheral shape data having a groove generated in the lens shape measuring apparatus in FIG. 1.
Figure 11:
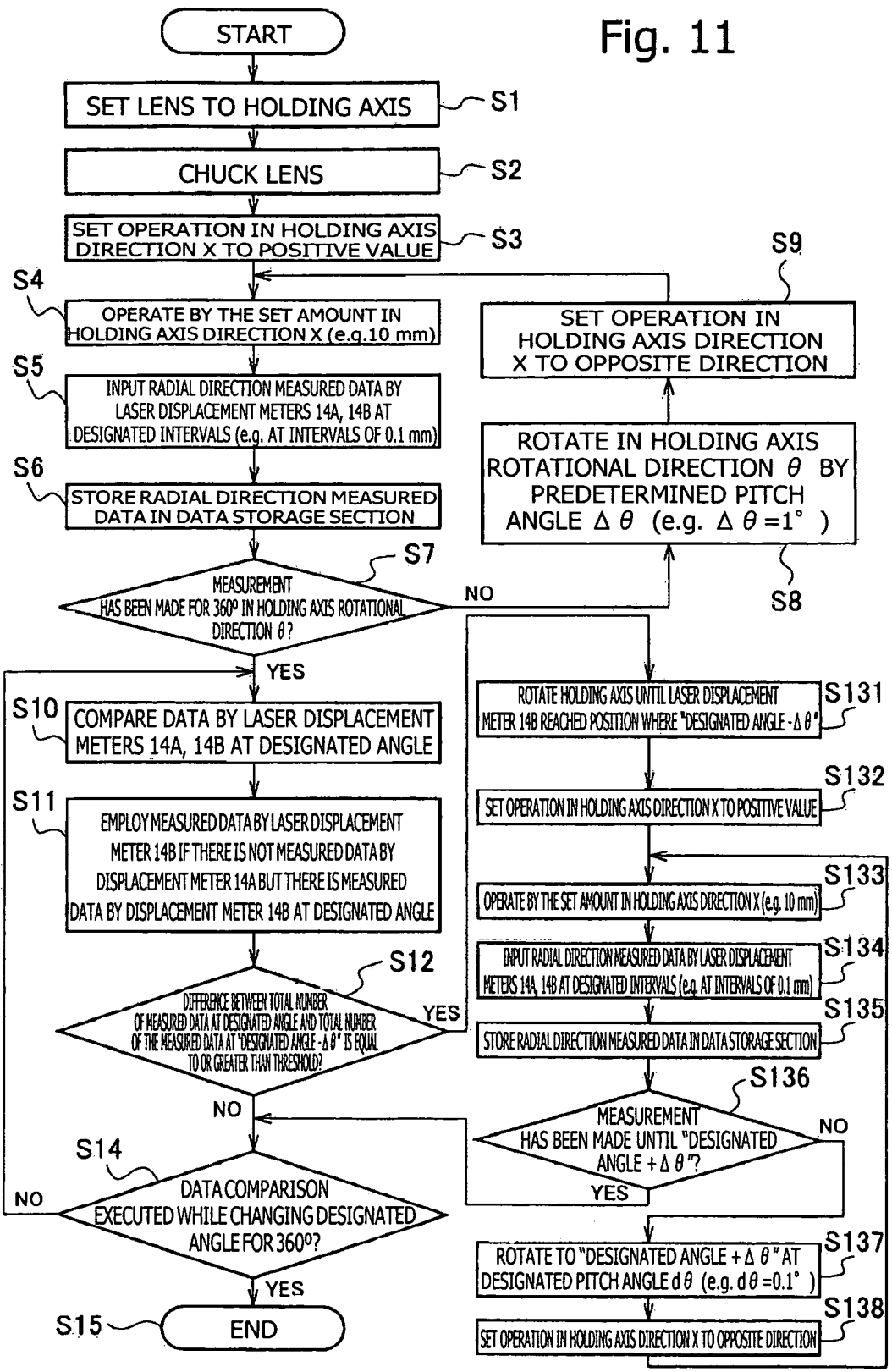
FIG. 11 is a flowchart showing the procedures for measuring a peripheral shape of a spectacle lens by moving a laser beam in the holding axis direction X.
Figure 12:
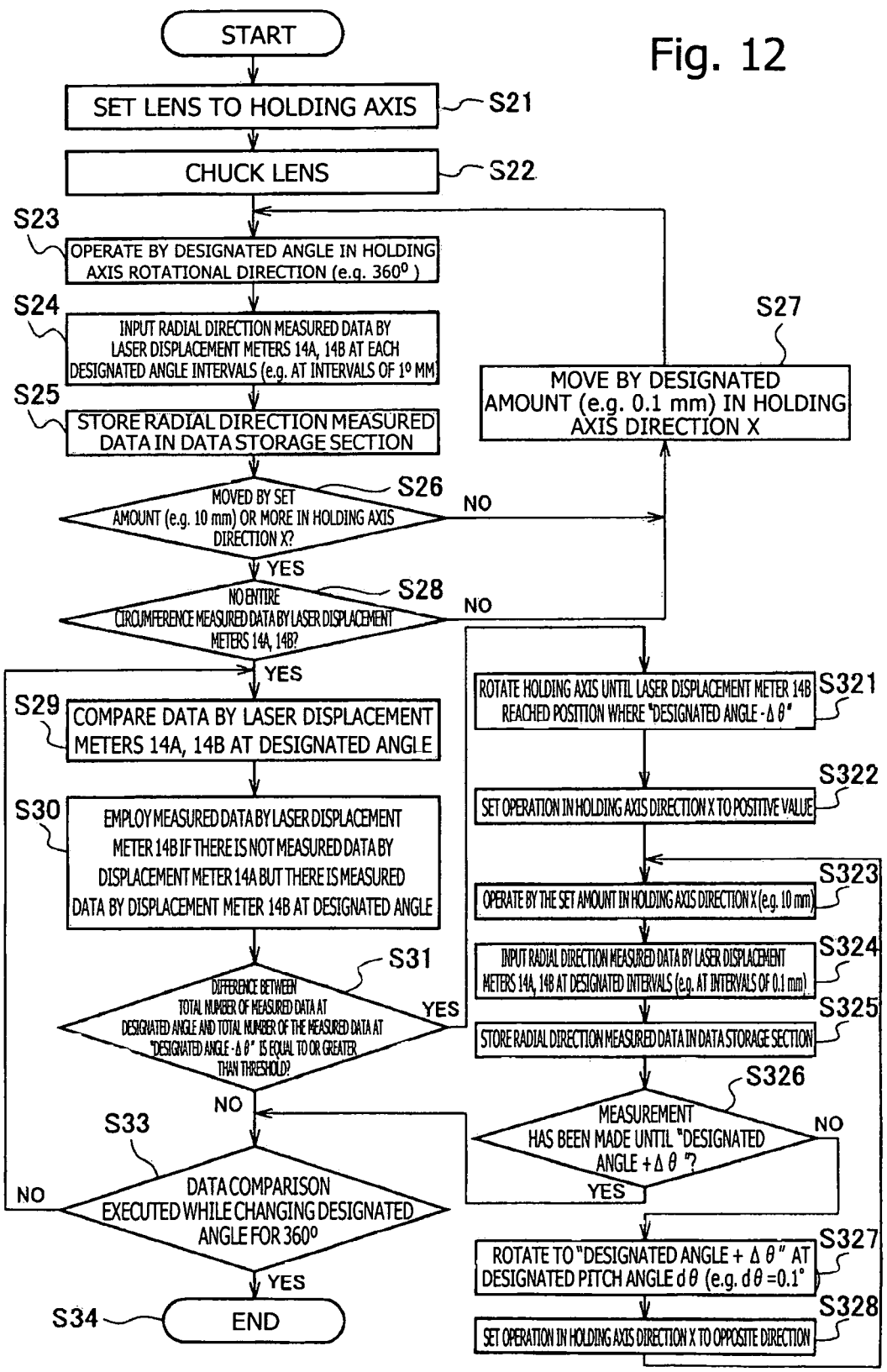
FIG. 12 is a flowchart showing the procedures for measuring a peripheral shape of a spectacle lens by moving a laser beam in the holding axis rotational direction θ.
Figure 13:
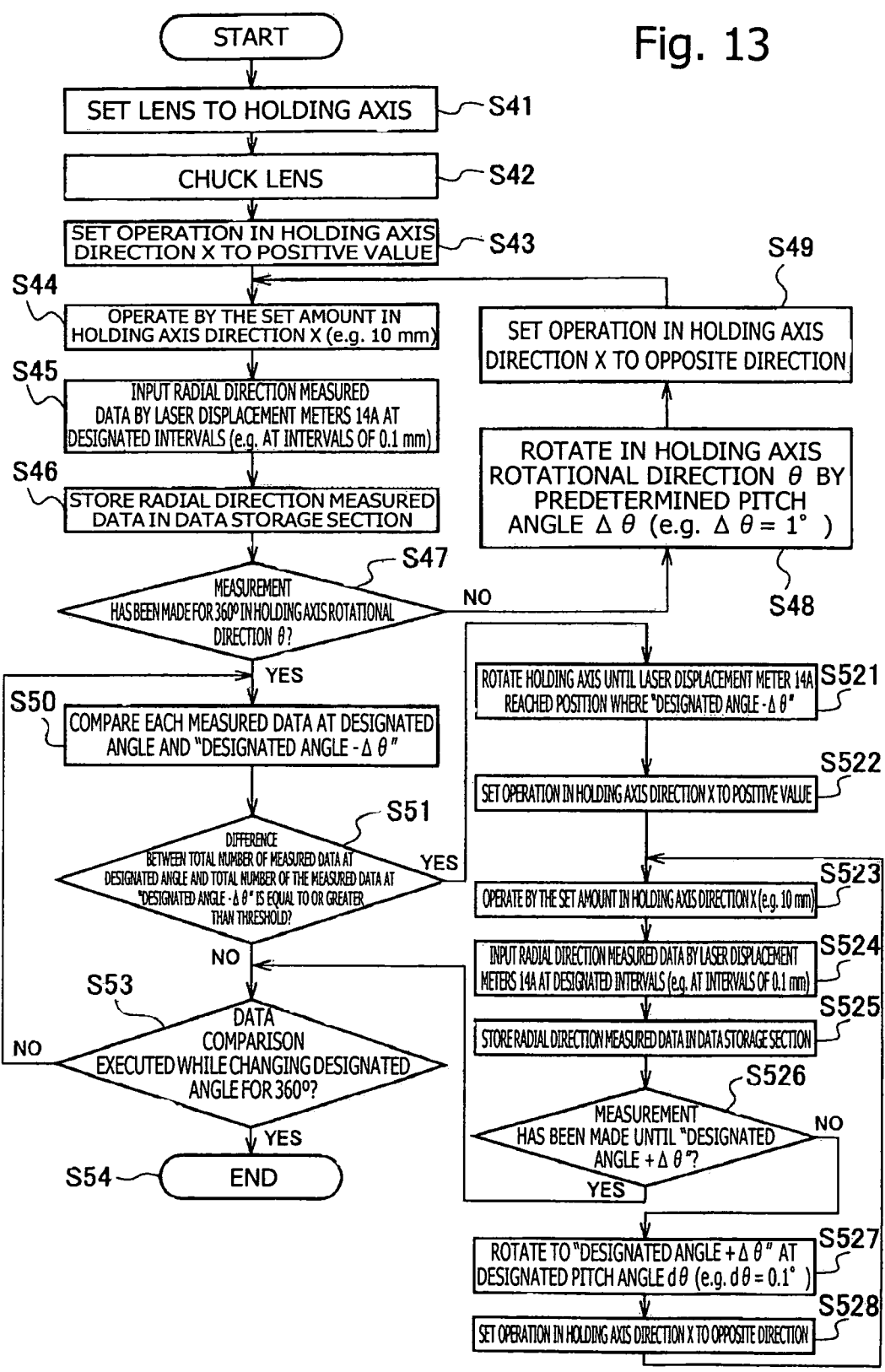
FIG. 13 is a flowchart showing the procedures for measuring the peripheral shape of the lens by moving a laser beam in the holding axis direction X in the lens shape measuring apparatus according to the second embodiment of to the present invention.
Figure 14:
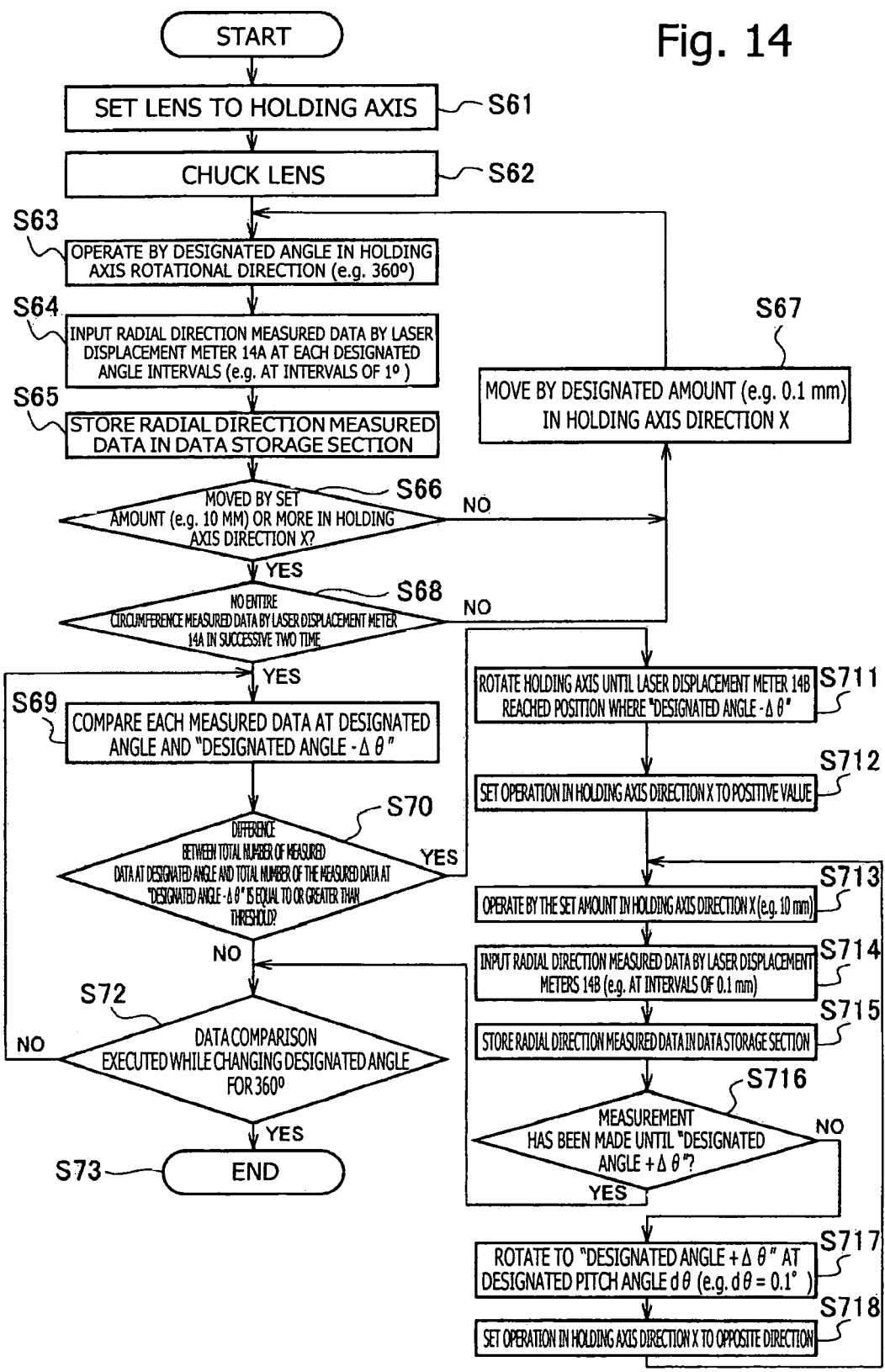
FIG. 14 is a flowchart showing the procedures for measuring the peripheral shape of the lens by moving a laser beam in the holding axis direction X in the lens shape measuring apparatus according to the second embodiment of to the present invention.
Figure 15:
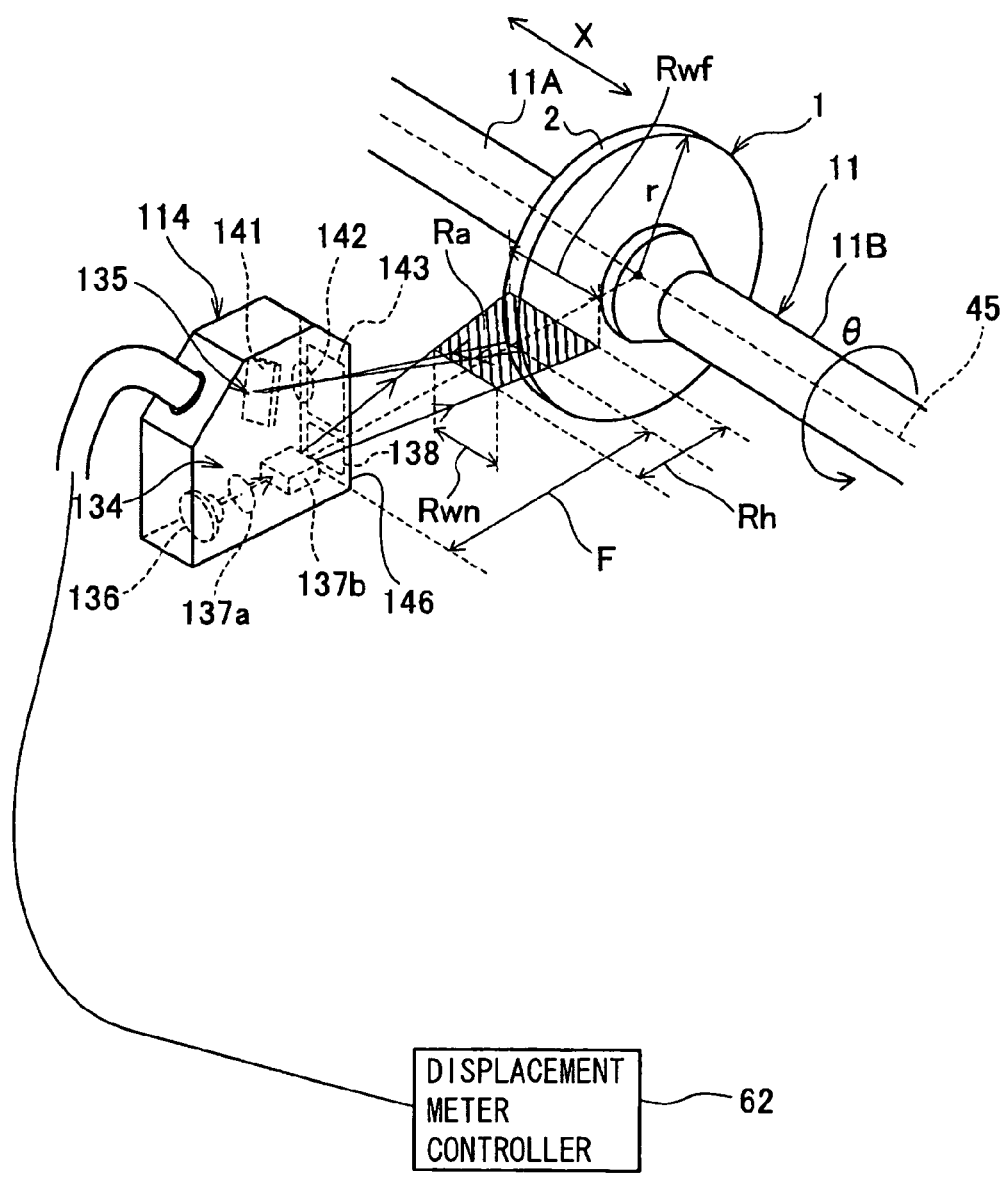
FIG. 15 is a magnified perspective view showing a part of the measuring apparatus body of the lens shape measuring apparatus according to the third embodiment of the present invention.
Figure 16:
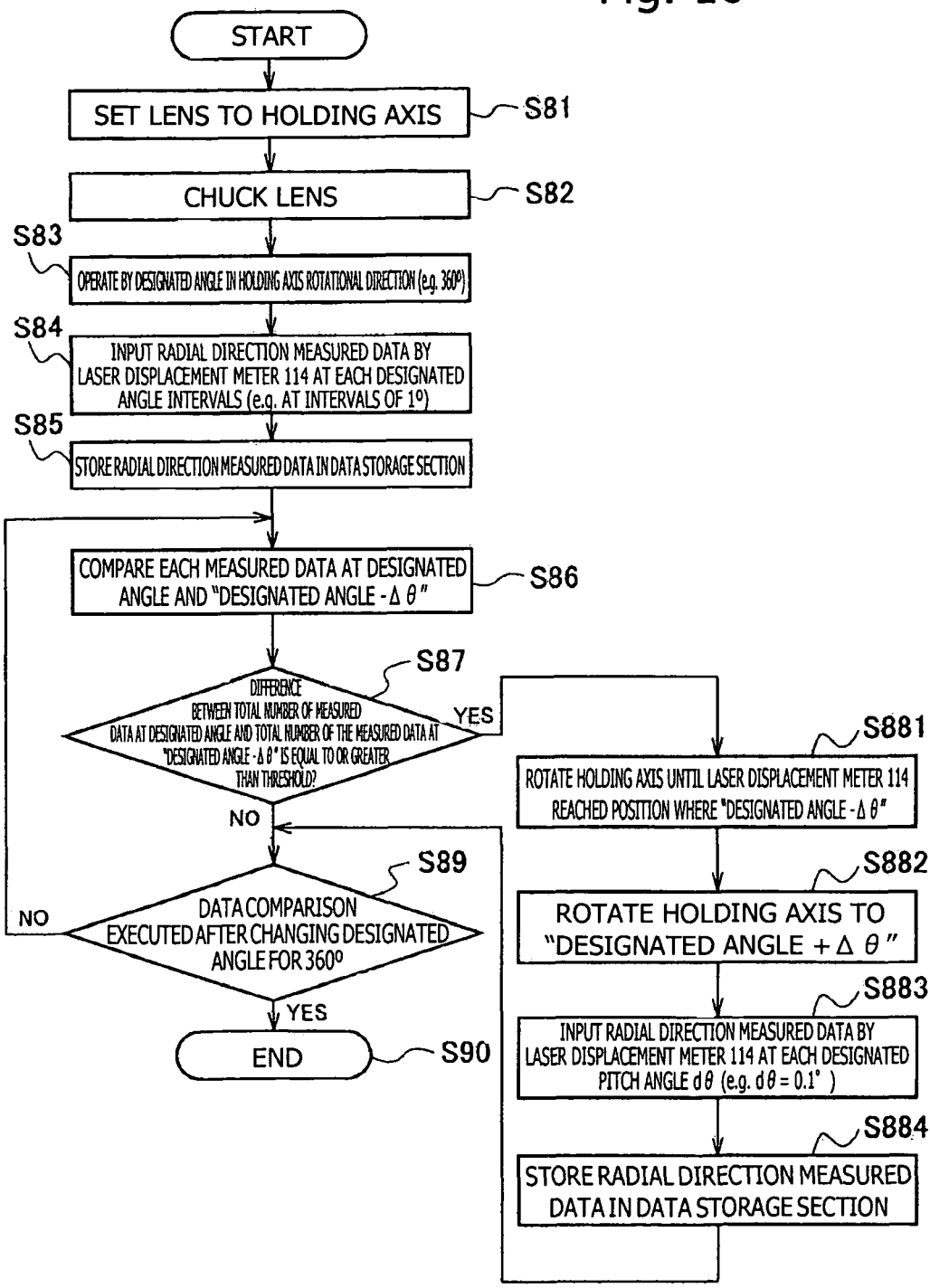
FIG. 16 is a flowchart showing the procedures for measuring the peripheral shape of the lens in the lens shape measuring apparatus according to the third embodiment.

The invention claimed is:

1. A lens shape measuring apparatus for measuring a shape of an edge surface of an edged spectacle lens, the measuring apparatus comprising:

a lens holding mechanism section that holds the edged spectacle lens with a holding axis from a side of a lens surface, the edge surface extending in a different direction than the side of the lens surface;

a first laser displacement meter that is fixed at a position separated from an axis line implicit of the holding axis by a predetermined distance in a radial direction of the edged spectacle lens, and has a light projecting section that projects a laser beam and a light receiving section that receives the laser beam, wherein the light projecting section and the light receiving section are installed to be aligned in a direction perpendicular to the axis line of the holding axis, the first laser displacement meter measures displacement of the edge surface of the edged spectacle lens by irradiating the edge surface of the edged spectacle lens with the laser beam from the light projecting section, and receiving a reflected light thereof by the light receiving section;

a holding position changing section that changes a position of the edged spectacle lens with respect to the first laser displacement meter that is expressed by a position in a direction of the axis line of the holding axis and a position around the axis line of the holding axis;

a holding position control section that sequentially changes the position of the edged spectacle lens, in accordance with a previously defined rule, by controlling the holding position changing section;

a lens shape obtaining section that obtains the shape of the edge surface of the edged spectacle lens by obtaining a distance between the edge surface of the edged spectacle lens and the axis line of the holding axis, based on a distance between the axis line of the holding axis and the first laser displacement meter, and measurement output of the first laser displacement meter for each position of the edged spectacle lens to be changed by the holding position control section; and a second laser displacement meter which is installed at a position separated from the axis of the holding axis by a predetermined distance in the radial direction of the edged spectacle lens so that alight projecting section for projecting a laser beam and a light receiving section for receiving a laser beam are aligned in one of (1) a plane containing the axis line of the holding axis and (2) a plane in parallel with the axis line of the holding axis, wherein if it is determined that a measured value acquired by the first laser displacement meter is not a proper value, the measured value acquired by the first laser displacement meter is complemented with a measured value acquired by the second laser displacement meter at a same measurement position with the first laser displacement meter.

2. The lens shape measuring apparatus according to claim 1, wherein the holding axis of the lens holding mechanism section is rotatable around the axis line and movable along the axis line, the change of the position of the edged spectacle lens is made by changing a rotational position and an axial direction position of the holding axis, and the irradiation of the laser beam by the first laser displacement meter is made by irradiating the laser beam in a spot-like form.

3. The lens shape measuring apparatus according to claim 2, wherein the change of the position of the edged spectacle lens is made by moving the axial direction position at each rotational position on the holding axis.

4. The lens shape measuring apparatus according to claim 3, wherein the movement of the axial direction position is made in one direction at each rotational position on the holding axis, and the movement direction is changed in an opposite direction every time the rotational position is changed.

5. The lens shape measuring apparatus according to claim 2, wherein the change of the position of the edged spectacle lens is made by changing the rotational position at each axial direction position on the holding axis.

6. The lens shape measuring apparatus according to claim 5, wherein the measurement of the displacement of the edge surface of the edged spectacle lens is completed when it is determined that the measurement cannot be made for an entire circumference of the edge surface of the edged spectacle lens.

7. The lens shape measuring apparatus according to claim 1, wherein the holding axis of the lens holding mechanism section is rotatable around the axis line, the change of the position of the edged spectacle lens is made by changing the rotational position of the holding axis, and the irradiation of the laser beam by the first laser displacement meter is made by irradiating the laser beam in a line-shaped form.

8. The lens shape measuring apparatus according to claim 1, wherein the first laser displacement meter is installed such that a measurement range width R thereof satisfies equation (1), and a distance L from the axis line of the holding axis to a reference surface of the first laser displacement meter satisfies equation (2):

$$R \geq (A-B)/2 \quad (1)$$

$$F+(A-R)/2 \leq L \leq F+(B+R)/2 \quad (2)$$

where, F denotes a reference distance of the first laser displacement meter, which is a distance from a reference surface to a center of a measurement range, A denotes a maximum width in the radial direction of the edged spectacle lens, and B denotes a minimum width in the radial direction of the edged spectacle lens.

9. The lens shape measuring apparatus according to claim 1, wherein the first laser displacement meter is installed such that the irradiation of the laser beam is made in a direction perpendicular to the axis line of the holding axis.

10. The lens shape measuring apparatus according to claim 1, wherein if it is determined that a measured value by the first laser displacement meter is not a proper value, measurements are conducted before and after a measurement position thereof at smaller measurement intervals with respect to a rotational direction of the holding axis.

11. A method of manufacturing an edged spectacle lens, comprising the steps of:

measuring a shape of an edge surface of the edged spectacle lens after edging an uncut lens, by using the lens shape measuring apparatus according to claim 1;

comparing a measurement result thereof and a design value which is created in advance; and determining acceptance or rejection of the edged spectacle lens.

12. A method for manufacturing spectacles by mounting the edged spectacle lens which is determined as acceptable by the method of manufacturing an edged spectacle lens according to claim 11, on a spectacle frame.

13. The lens shape measuring apparatus according to claim 1, wherein the holding position changing section includes:

a moving section that moves the edged spectacle lens held by the lens holding mechanism section in a direction of the axis line of the holding axis; and a rotating section that rotates the edged spectacle lens held by the lens holding mechanism around the axis line of the holding axis, wherein the holding position control section sequentially changes the position of the edged spectacle lens in accordance with the previously defined rule by controlling the moving section and the rotating section.

14. A lens shape measuring method for measuring a shape of an edge surface of an edged spectacle lens, comprising the steps of:

holding the edged spectacle lens with a holding axis from a side of a lens surface, the edge surface extending in a different direction than the side of the lens surface;

providing a first laser displacement meter, which is fixed at a position separated from an axis line of the holding axis by a predetermined distance in a radial direction of the edged spectacle lens;

changing a position of the spectacle lens with respect to the first laser displacement meter, the position of the edged spectacle lens being expressed by a position in a direction of the axis line of the holding axis and a position around the axis line of the holding axis;

irradiating a laser beam to the edge surface of the edged spectacle lens by the first laser displacement meter at each position of the edged spectacle lens:

receiving a reflected light thereof by the first laser displacement meter;

sequentially changing the position of the edged spectacle lens in accordance with a previously defined rule; and obtaining the shape of the edge surface of the edged spectacle lens by obtaining the shape of the edge surface of the edged spectacle lens by obtaining a distance between the edge surface of the edged spectacle lens and the axis line of the holding axis based on a distance between the axis line of the holding axis and the first laser displacement meter and measurement output of the first laser displacement meter for each position of the edged spectacle lens, wherein the irradiating of the laser beam and the receiving the reflected light by the first laser displacement meter are executed in a direction perpendicular to the axis line of the holding axis;

providing a second laser displacement meter, which is installed at a position separated from the axis line of the holding axis by a predetermined distance in the radial direction of the edged spectacle lens for irradiating a laser beam and receiving a reflected light in a plane containing the axis line of the holding axis or in a direction parallel to the plane, and if it is determined that a measured value acquired by the first laser displacement meter is not a proper value, complementing the measured value acquired by the first laser displacement meter with a measured value acquired by the second laser displacement meter at a same measurement position with the first laser displacement meter.

15. The lens shape measuring method according to claim 14, further comprising a step of:

if it is determined that a measured value by the first laser displacement meter is not a proper value, conducting measurements before and after a measurement position thereof at smaller measurement intervals with respect to a rotational direction of the holding axis.

* * * * *